United States Patent

Kutschbach

(10) Patent No.: US 11,144,348 B2
(45) Date of Patent: Oct. 12, 2021

(54) HETEROGENEOUS COMPUTING SYSTEM AND METHOD INCLUDING ANALYZING EXPECTED COSTS OF COMPUTE KERNELS

(71) Applicant: ILNumerics GmbH, Berlin (DE)

(72) Inventor: Haymo Kutschbach, Berlin (DE)

(73) Assignee: ILNumerics, GmbH, Berlin (DE)

( * ) Notice: Subject to any disclaimer, the term of this patent is extended or adjusted under 35 U.S.C. 154(b) by 106 days.

(21) Appl. No.: 16/607,263

(22) PCT Filed: Apr. 27, 2018

(86) PCT No.: PCT/EP2018/060932
§ 371 (c)(1),
(2) Date: Oct. 22, 2019

(87) PCT Pub. No.: WO2018/197695
PCT Pub. Date: Nov. 1, 2018

(65) Prior Publication Data
US 2020/0301736 A1 Sep. 24, 2020

(30) Foreign Application Priority Data
Apr. 28, 2017 (DE) .................... 10 2017 109 239.0

(51) Int. Cl.
*G06F 9/46* (2006.01)
*G06F 9/48* (2006.01)
(Continued)

(52) U.S. Cl.
CPC .......... *G06F 9/4881* (2013.01); *G06F 9/5044* (2013.01); *G06F 9/52* (2013.01); *G06F 2209/486* (2013.01)

(58) Field of Classification Search
CPC ........ G06F 9/4881; G06F 9/5044; G06F 9/52; G06F 2209/486
See application file for complete search history.

(56) References Cited

U.S. PATENT DOCUMENTS 10,558,500 B2  2/2020  Goldsack et al.
2011/0173155 A1  7/2011  Becchi et al.

FOREIGN PATENT DOCUMENTS

WO  2017/016590  2/2017

OTHER PUBLICATIONS

Phitchaya Mangpo Phothilimthana, et al. ""Portable Performance on Heterogeneous Architectures"", In: Proceedings of the ASPLOS'13, Houston, Texas, USA, Mar. 16-20, 2013, S. 1-13.
(Continued)

*Primary Examiner* — Gregory A Kessler
(74) *Attorney, Agent, or Firm* — Dicke, Billig & Czaja, PLLC

(57) ABSTRACT

A heterogeneous computing system and computer-implemented method are disclosed. In one example, the method includes initializing a first processing unit of a heterogeneous computing system with a first compute kernel and a second processing unit of the heterogeneous computing system with a second compute kernel. Both the first compute kernel and the second compute kernel are configured to perform a numerical operation derived from a program segment. In one example, the method includes one of executing the first compute kernel on the first processing unit to perform a numerical operation on the runtime instance if the first expected costs are lower than or equal to the second expected costs, and executing the second compute kernel on the second processing unit to perform a numerical operation on the runtime instance if the first expected costs are higher than the second expected costs.

20 Claims, 6 Drawing Sheets

"

(51) Int. Cl.
    *G06F 9/50*     (2006.01)
    *G06F 9/52*     (2006.01)

(56) References Cited

OTHER PUBLICATIONS

J. Ansel, et al.: PetaBricks: A Language and Compiler for Algorithmic Choice. In: Proceedings of the PLDI'09, Dublin, Ireland, Jun. 15-20, 2009, S. 38-49.

Hadi Emaeilzadeh, et al.: Programming Hetereogeneous Hardware Components with Software Components. In: Workshop on SoC Architectures, Accelerators and Workloads (SAW), Feb. 2011, San Antonio, US, 2011.

International Search Report and Written Opinion in PCT/EP2018/060932 dated Aug. 3, 2018.

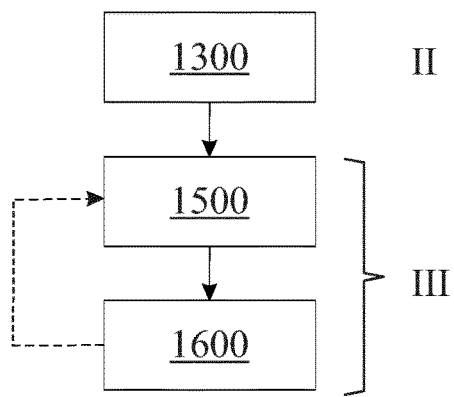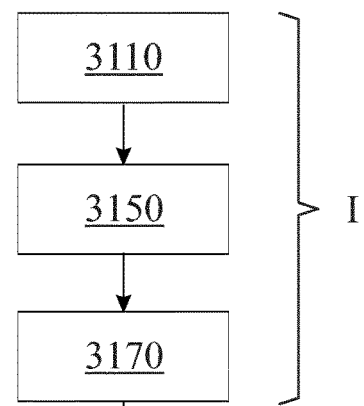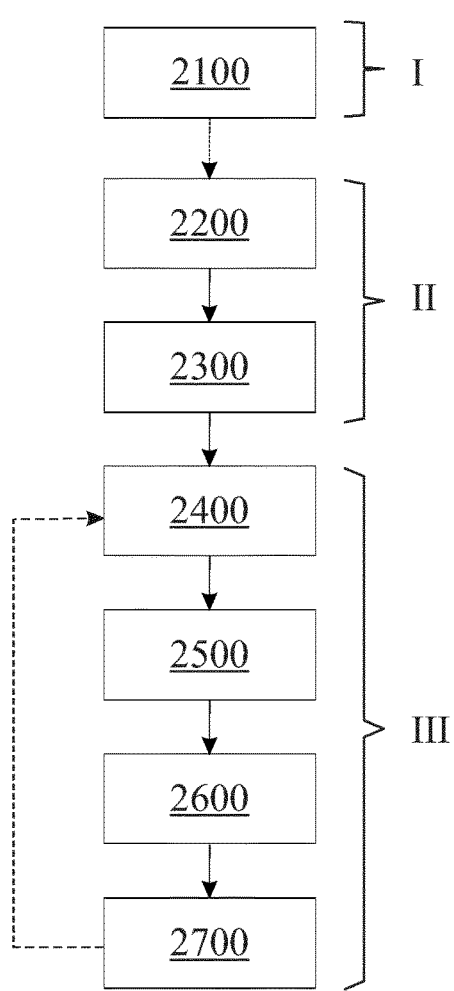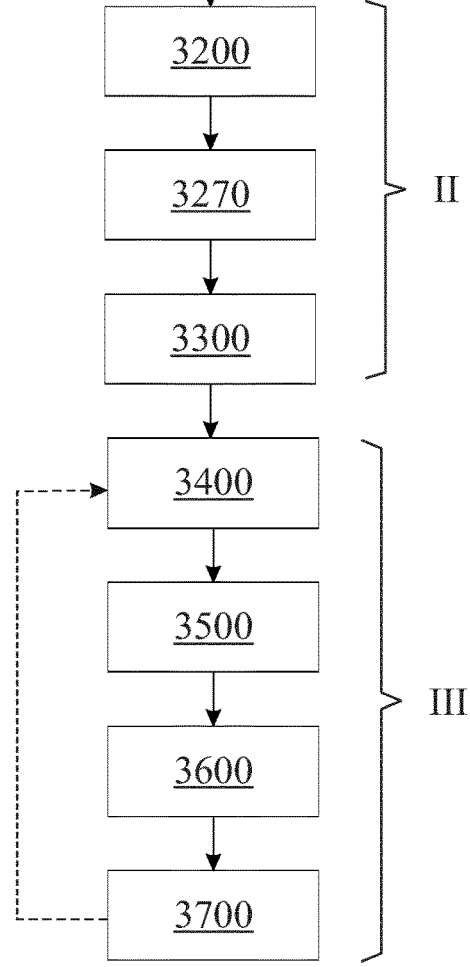

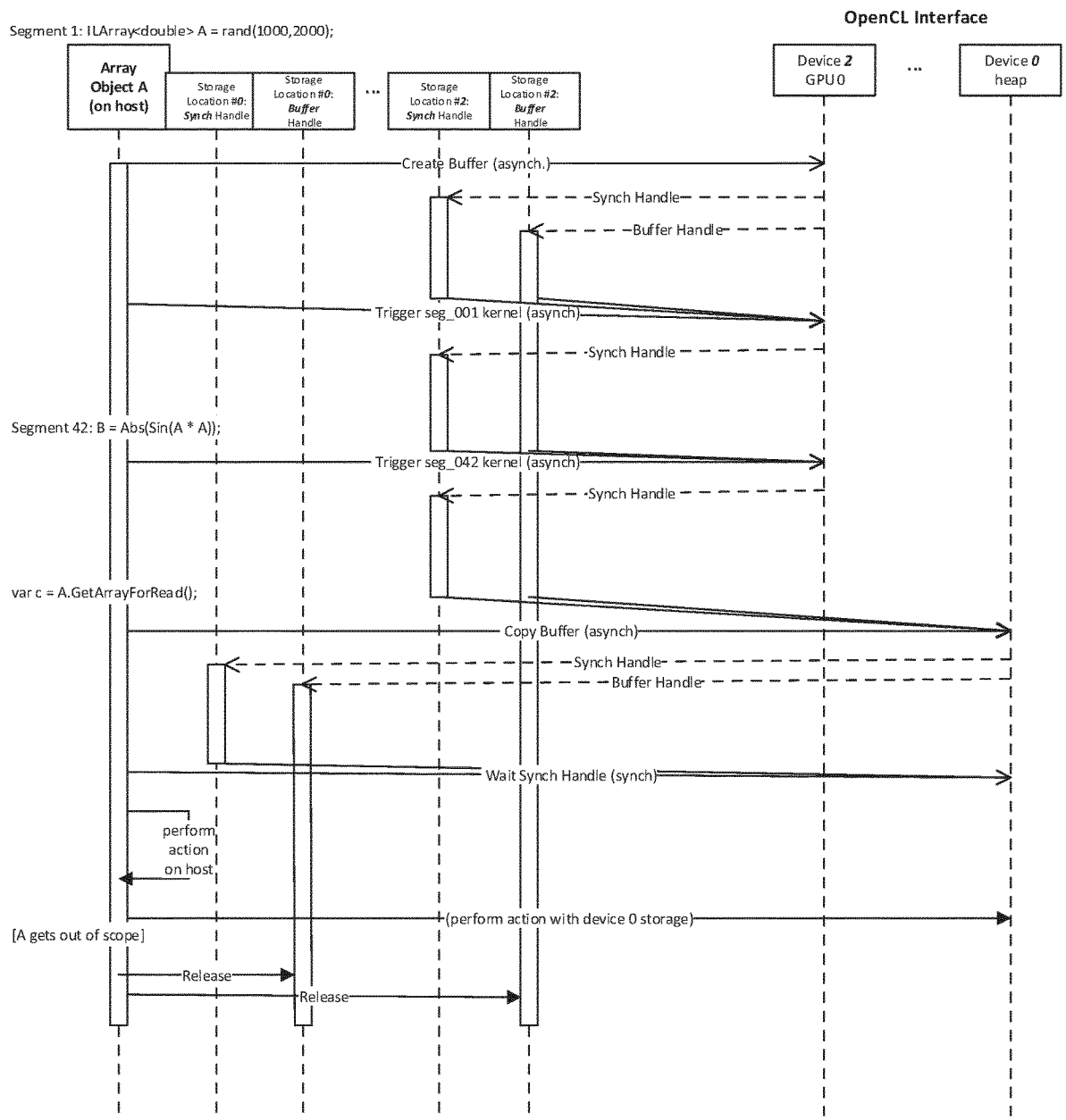

HETEROGENEOUS COMPUTING SYSTEM AND METHOD INCLUDING ANALYZING EXPECTED COSTS OF COMPUTE KERNELS

CROSS REFERENCE TO RELATED APPLICATIONS

This Utility Patent Application claims priority under 35 U.S.C. § 371 to International Application Serial No. PCT/EP2018/060932, filed Apr. 27, 2018, which claims the benefit of German Patent Application No. DE 10 2017 109 239.0, filed Apr. 28, 2017; which are both incorporated herein by reference.

TECHNICAL FIELD

Embodiments of the present invention relate to computer-implemented methods, in particular to computer-implemented methods for executing numerical algorithms on heterogeneous computing systems, a heterogeneous computing system and a computer-readable media.

BACKGROUND

High demand exists for efficient utilization of heterogeneous computing resources, in particular in the field of numerics and for data analysis. This involves the task of parallelizing programs which is often tedious, cost intensive and requires significant knowledge of low level computer architectures and programming technologies related thereto.

The starting point has traditionally been the common set of general purpose programming languages (GPL), such as C/C++, C#, FORTRAN, Pascal and Java. Such languages generally work on a low granularity of data, dealing with scalar data as basic data elements and arbitrary control instructions. While compiler technology has been successfully improved for single processor execution, compilation of (GPL) programs for heterogeneous computing systems remains challenging.

For example, the compiler has to make certain decisions: which processing units to target, how to instruct the processing units to process the data and how to provide the data to the processing units. Challenges include the broad diversity of (rapidly changing) computing hardware, the complexity of arbitrary GPL language elements and instruction graphs, the dynamic nature of the data to be processed, and the times when all constraining information become eventually available. Further, the compiler often requires significant decision making support from the programmer. As a result, the parallelization potential of many software programs, e.g. most GPL based programs is typically only partly accessible and efficiently transformable to heterogeneous systems, respectively. Further, due to the overhead introduced, the so far used automated parallelization approaches may only be worth for relatively large data sizes and large code segments, respectively.

Thus, existing systems follow a "top-down" approach by attempting to distribute parts of a larger program to accelerating devices for faster computation, and trying to maximize those parts. The spectrum of challenges includes the complexity (size of parameter space) of potential execution paths, the variation of the data, and the complexity (diversity, unpredictability) of the system state during execution.

Accordingly, there is a need to improve parallelization of software programs for heterogeneous computing architectures.

SUMMARY

According to an embodiment of a computer-implemented method the method includes initializing a first processing unit of a heterogeneous computing system with a first compute kernel and a second processing unit of the heterogeneous computing system with a second compute kernel. Both the first compute kernel and the second compute kernel are configured to perform a numerical operation derived from a program segment which is configured to receive a first data structure storing multiple elements of a common data type. The program segment includes a function meta information including data related to a size of an output of the numerical operation, a structure of the output, and/or an effort for generating the output. The function meta information and a data meta information of a runtime instance of the first data structure are used to calculate first expected costs of executing the first kernel on the first processing unit to perform the numerical operation with the runtime instance and to calculate second expected costs of executing the second kernel on the second processing unit to perform the numerical operation with the runtime instance. The data meta information includes a runtime size information of the runtime instance and a runtime location information of the runtime instance. The method further includes one of executing the first compute kernel on the first processing unit to perform the numerical operation on the runtime instance if the first expected costs are lower than or equal to the second expected costs, and executing the second compute kernel with the second processing unit to perform the numerical operation with the runtime instance if the first expected costs are higher than the second expected costs. The data meta information may further include a runtime synchronization information of the runtime instance and/or a runtime type information of the runtime instance.

In the context of the present specification, the term "processing unit" intends to describe a hardware device, in particular a processor, which is capable to perform operations and/or calculations according to instructions typically stored in a unit specific compute kernel.

The processing unit may be a single core CPU (central processing unit), a multicore CPU, a CPU with vector extension (such as SSE/AVX), a GPU (graphics processing unit), a CPU integrating at least one GPU, a coprocessor supporting numerical computations, SIMD accelerator (single instruction, multiple data accelerator), a microcontroller, a microprocessor such as a DSP (digital signal processor), and an FPGA (field-programmable gate array) or a combination of one or more of those devices typically forming a so-called virtual processor.

In the context of the present specification, the term "effort for generating the output" intends to describe a numerical effort (purely computational costs) for generating the output. The respective function meta information may include a numerical effort factor or even several numerical effort factors. Prior to runtime, the function meta information may be updated in accordance with hardware properties (properties of the processing units). In the context of the present specification, the term "expected costs" intends to describe expected overall costs for performing the numerical operation with a runtime instance on a given processing unit at runtime. The expected costs typically refer to computational costs on the given processing unit at runtime and may include transfer costs (when the processing unit has not yet access to the runtime instance). The expected costs may be calculated using the function meta information, e.g. the numerical effort factor(s), and the data meta information, in particular a runtime size information of the runtime instance and a runtime location information of the runtime instance. In the context of the present specification, the term "compute kernel" intends to describe compiled software code which is capable of performing a specific numerical operation with a runtime instance of a data structure capable of storing multiple elements of a common data type when executed by a processing unit.

The first data structure and/or the runtime instance of the first data structure may be capable to store a variable number of the respective common data type such as integer, float, complex and the like.

The first data structure and/or the runtime instance of the first data structure are typically n-dimensional rectilinear data structures.

The first data structure and/or the runtime instance of the first data structure may be a collection (in the sense of the .NET framework), a vector, an array, a list, a queue, a stack, a graph, a tree or a pointer to such a structure. For reasons of simplicity, the data structure is assumed to represent a multidimensional array (a vector, a matrix or higher dimensional mathematical data), and the numerical operation is assumed to be an array operation in the detailed description if not stated otherwise. In the following the terms rectilinear array and matrix are used synonymously. Rectilinear arrays are often used in scientific or technical algorithms. For example, the pixel elements of a display screen or a camera image sensor arranged in rows and columns, respectively, may be stored in a corresponding 2D/or 3D-rectilinear array.

Typically, the runtime instance of the first data structure stores data representing technical information in various stages of completion being processed throughout the program, such as measurement data, images, sound data, simulation data, control data, state data, and so forth, as well as intermediate results.

Since the costs are determined at runtime prior to executing the numerical operation (e.g. immediately before executing the numerical operation) and taking into account both the function meta data (function meta information) and the data meta information of the runtime instance of the first data structure, the numerical operation can be executed by the processing unit which is at the particular (runtime) configuration best suited for this purpose. Compared to other approaches this can be achieved with lower overhead. As a result, the heterogeneous computing system can handle data structures of different size (on average) more efficiently compared to other approaches.

For example, the costs of performing the numeric operation of calculating the sum of the square of all elements of a matrix A, sum(A^2), can be expressed as a function of the size of A. If the statement is to be executed multiple times, individual invocations may associate individual sizes of A. Typically, the operation sum(A^2) is efficiently performed on a GPU if A is sufficiently large, in particular for element types supported on the GPU. However, if A contains only a few or even only a single element, a CPU may be better suited, in particular if the CPU but not the GPU has already direct access to or even stores the matrix A at the time the operation is about to be performed.

Thus, the expected costs typically depend on the numeric operation, the size of the runtime instance, the storage place of the runtime instance of the data structure and the (computational) properties of the available processing units (CPU, GPU, . . . . ).

For this reason, traditional compilers fail to take into account all of: the broad diversity of hardware available at runtime (CPUs, multicore CPUs, CPU vector extensions, SIMD accelerators, GPU devices, FPGA, DSP, multiple memory models), the complexity of general purpose languages and instruction graphs, the dynamic nature of the data to be processed (data sizes and locations change between multiple calls of the same code segment). The times when all constraining information becomes eventually available make significant runtime support obligatory. Both, static compilation and dynamic compilation (at runtime) will add a huge overhead to the actual numerical operation. This tends to make the resulting program inefficient (slow) for comparatively small input data or even mid-sized input data, and thus for input data of varying size and/or structure.

Likewise, traditionally compiling special languages used in technical computing (domain specific languages, DSLs) which enable the formulation of numerical algorithms based on n-dimensional array structures such as Mathworks' MATLAB, ILNumerics and NumPy tend to show good execution performance only for sufficiently large input data. The burden of manually assigning (sufficiently large) program parts to execution units is however delegated to the programmer at development time. Obviously, this approach is neither able to adopt to processing hardware changes (without adopting the program) nor to efficiently utilize heterogeneous computing resources for small program segments and for varying (small) input data sizes.

Different thereto, the approach described herein, allows to perform the desired actions (in particular collecting information and making decisions) at particularly opportune times, namely at compile time, at start-up time and at runtime. The decision about the execution path is particularly made, such as only made, at runtime and thus at a time when all desired information is available both for the runtime instance of the data structure(s) and for the hardware (processing units)/current hardware load. This allows reducing the overhead and automatically adopting to a broad variety of data sizes and hardware configurations.

Further, a time consuming simulation (typically several hours) for determining execution times for a given numerical operation on a given hardware with different trial data falling into different size classes is, prior to deciding at runtime for an execution path based on the size class of the workload data, not required. While such an approach may be efficient for some large data and some small (complexity) algorithms, it cannot guarantee the best execution path as the (multi-dimensional) size-grading has to be course to avoid even longer simulation times. Further, this approach can neither take into account the hardware load nor the actual storage locations of the workload data at runtime. Even further, a complete new simulation is typically required in this approach if a user amends the program code or the processing hardware is changed.

Contrary to this and other approaches, the approach described herein is also able to scale up to algorithms of any complexity or even whole programs. No a-priori simulation or optimization pass is required for anticipating the optimal execution path for several subsequent program segments at runtime and for the runtime data. While such a-priori simulation or optimization is commonly very time and/or energy consuming the quality of solutions (execution path configurations) found this way is limited. On the one hand, the number of subsequent segments has to be kept small for simulation/optimization (for a reasonably small size of the parameter space) which leads to coarse-grained segmentation and/or limits the overall program size. On the other hand, a fine-grained segmentation is often required for reacting to changed execution paths due to changed workload data values. Furthermore, a solution found by optimization typically marks only a local minimum. In order to find the optimal execution path (global optimum) for an algorithm on a heterogeneous computing system, all depending parameters are to be considered, including the actual workload data. Therefore, global optimization is often not feasible.

The methods and systems described herein are based on a bottom-up approach: starting with base numerical operations as fundamental building blocks of more complex algorithms, the best execution options are evaluated directly at runtime. Here, the granularity of both the data and the instructions plays an important role and is taken into account for best execution performance.

In particular, the entangled system "processor and instruction" is unbound and replaced by functions (instructions), which are capable of handling arrays instead of scalar data, are abstract, i.e. not assigned to a concrete processor, and are able to provide cost relevant information (function meta data) ahead of their execution. The focus on a single, main processor is replaced with the entirety of suitable execution devices.

The complexity of functions/instructions is increased by the ability to process dynamic data sizes as well as the ability to inform in advance about associated costs. The assignment of the workload (array functions/instructions+dynamic data) to the best suited processing unit(s)/device(s) takes place at runtime, typically immediately before the execution and can thus take into account the current overall state of the system.

Accordingly, small input data, mid-sized input data, and large input data can be efficiently handled by the respective most suited execution unit with little overhead by one single compiled representation of the program segment.

For example, a user generated program code may be parsed to identify program segments with respective (known) numerical operations in the program code at compile time. Further, function meta information of the respective numerical operation may be determined and a respective runtime segment including a respective first compute kernel, a respective second compute kernel, and the respective function meta information may be formed at compile time.

The program code may include several typically subsequent program segments forming a program sequence.

The term "sequence" as used in this specification intends to describe a user program or a section of the user program comprising program segments.

The term "program segment" as used in this specification intends to describe software code referring to instructions typically on the abstract level for handling input and/or output arguments of one or more data structures capable of storing multiple elements of respective common data type. The "program segment" may include simple language entities such as array functions, -statements, -operators and/or combinations thereof which are identifiable by a compiler. For example, the expression 'sin(A)+linsolve(B+3*cos(A))', with matrices A and B, may be a segment. Alternatively, 'sin(A)' and 'linsolve(B+3*cos(A))' may be respective segments.

The term "runtime segment" as used in this specification intends to describe a compiled representation of a program segment. The compiled representation is executable on a heterogeneous computing system and typically includes respective compute kernels for each processing unit of the heterogeneous computing system and control code for calculating the expected cost for runtime instances of the data structure(s) and for selecting a processing unit for executing its compute kernel and/or for distributing the workload over two or more processing units using the expected costs.

Additionally, further information such as current workload of the processing unit and/or locality of data may be taken into account for selecting the processing unit and/or for distributing the workload.

Runtime segments may be created, merged and/or revised or even optimized by the compiler and instantiated and updated at runtime.

Function meta data (function meta information) are typically stored in the runtime segment. Often, function meta information are stored with and maybe derived from program segments. The compiler may update and maintain the information when segments are merged, revised and/or optimized and when concrete device capabilities are known at runtime.

The numerical operations in the program code may correspond to items of a reduced set of computing instructions for data structures storing multiple elements of a common data type. This may facilitate efficient generating and/or executing of compute kernels and/or function meta information.

However, the program code may also include intermediate portions without numerical operations identifiable by the compiler. These portions may be handled in a traditional way.

The program segments may first be translated into an intermediate representation, in particular a byte code representation or into a respective representation facilitating the execution on the processing units, e.g. using a compiler infrastructure such as LLVM (Low Level Virtual Machine) or Roslyn.

Later, i.e. at startup time on the particular heterogeneous computing system, the intermediate representations may be compiled into directly executable compute kernels comprising byte code and/or machine instructions.

At startup time, suitable processing units of the particular heterogeneous computing system may be determined, and the runtime segments may be updated in accordance with the determined processing units. This may include updating the compute kernels, the intermediate representation of the compute kernels and/or the function meta information. For example, a CPU kernel template and a GPU kernel template may be updated in accordance with properties of the actual devices. More particularly, numerical effort factors in the function meta information and/or lengths and/or types of vector data types in the intermediate representation of the compute kernels for executing a specific numerical operation on the actual processing units may be updated in the templates.

Further, the processing units may be initialized with the respective compute kernels.

After initializing, the function meta information and the data meta information of runtime instances of data structures are used to determine at runtime respective expected costs of executing the compute kernels on the respective processing units.

In one embodiment, a lazy execution scheme may be implemented. This involves delaying potentially time consuming initialization tasks to the time when the result of the initialization is required for execution for the first time. For example, the computing kernels of a specific runtime segment for a specific processing unit may be allocated and initialized on the processing unit only once it was decided for the corresponding runtime segment to execute the corresponding compute kernel on the corresponding processing unit.

Typically, both computational costs and transfer costs (referring to possible cost related to a transfer of the runtime instance to another processing unit) are taken into account for determining the expected costs.

Furthermore, a polynomial cost function may be used for determining the expected costs.

In particular, a bi-linear cost function has been found to be suitable for determining the expected costs in many cases. Many simple numerical operations have a numerical effort (computational costs) which depends only or substantially on the number of stored elements, such as calculating a function result for all elements individually. Accordingly, the number of elements may simply be multiplied with a respective numerical effort factor representing the parallel compute capabilities of the processing unit to calculate expected computational costs. Likewise, expected transfer costs may be calculated by multiplying the number of elements to be copied with a transfer factor (or zero if the processing unit has direct access to the stored elements) and added to the expected computational costs to calculate the expected (total) costs for performing the respective numerical operation under the current circumstances on each of the suitable processing units.

For more complex numerical operations, such as inverting a matrix, calculating matrix-vector products, solving a system of equations or determining eigenvalues and/or eigenvectors of a matrix (eig), calculating the fast fourier transformation (fft) of a matrix, the expected computational costs may also depend on the size of the output of the numerical operation, the structure or shape of the output or a value, the structure and/or the shape of the runtime instance of the input. For example, different numerical algorithms may be used depending on properties of the input data (sparse matrix vs. dense matrix, single vs. double floating point precision, matrix symmetry, size etc.) As explained below in more detail, information related to the output of the numerical operation may be derived by a compiler from meta data of the program segment.

This approach overcomes limitations of previously used approaches of execution cost determination.

For example, using the number and type of executable instructions in an intermediate representation or in the binary/object code ready for execution on a platform/processing unit as a measure for 'cost' is especially challenging because this needs to take into account the program flow in the program segment. Especially when the segment includes conditional directives (which is often the case when looping constructs are involved) an exact analysis is at least tedious and thus expensive. Furthermore, if the value of such conditionals is dynamically dependent on the input data sizes handled by the program segment this analysis has to be performed at runtime when such data sizes are known. The problem increases by the fact that most attempts try to deal with dynamic segment sizes, acquired from merging varying numbers of instructions for better efficiency. Each merged segment has again to be compiled with the specific compiler for each target platform which—again—must be performed at runtime.

Even further, if the actual time needed to execute a program segment is used as a measure of 'cost', a great overhead for deciding where to execute the code is required. Further, a large number of runs with differently sized and/or shaped input data may be required in order to derive a reliable cost model. For example, both the dimension of an input array and the length of the array in each dimension as well as the data type of the elements may have to be varied on the processing units to allow constructing a reliable cost model for the actual computation. Accordingly, this approach is inherently inefficient when performed dynamically for small input data sizes.

The program segments may be further configured to receive a second data structure capable of storing multiple elements of the common data type or another common data type.

For example, a program segment for calculating a matrix-vector product may be configured to receive a matrix and a vector. Likewise, a program segment for adding two matrices may be configured to receive two matrices.

According to an embodiment of a computer-readable medium the computer-readable medium includes instructions which, when executed by a computer comprising a first processing unit and a second processing unit cause the computer to carry out the method as described herein.

The computer is typically a heterogeneous computer having two (i.e. the first and second processing units) different processing units such as a CPU and a GPU or more different processing units. Typically, the different processing units are different to each other with respect to computational properties and/or capabilities, typically resulting from different physical properties. However, two different processing units may also have the same computational properties and/or capabilities but are differently utilized (have a different workload) at the time when a program segment is to be executed.

The computer-readable medium is typically a non-transitory storage medium.

According to an embodiment of a heterogeneous computing system the heterogeneous computing system includes at least two different processing units and a memory storing a runtime segment of a program segment configured to receive a first data structure capable to store multiple elements of a common data type. The program segment includes, provides and/or allows determining (by a compiler) a function meta information including data related to a size of an output of a numerical operation of the program segment, a structure of the output, and/or a numerical effort for generating the output. Each of the at least two different processing units has access to and/or forms at least a part of the memory storing a respective compute kernel of the runtime segment for each of the at least two processing units. Each compute kernel implements the numerical operation. The runtime segment includes or refers to executable code for determining a data meta information of a runtime instance of the first data structure. The data meta information includes at least one of a runtime size information of the runtime instance, a runtime location information of the runtime instance, a runtime synchronization information of the runtime instance and a runtime type information of the runtime instance. The runtime segment further includes or refers to executable code which is configured to use the function meta information and the data meta information to calculate for each of the at least two processing units respective expected costs of executing the respective compute kernel to perform the numerical operation with the runtime instance. The runtime segment further includes or refers to executable code for selecting one of the at least two different processing units for executing the respective compute kernel so that the determined expected costs of the selected one of the at least two processing units corresponds to a lowest value of the determined expected costs.

A sequence of runtime segments may be stored in the memory.

The executable code for calculating the expected cost and the executable code for selecting the one of the at least two different processing units may be included in a control kernel of the runtime segment.

Typically, the heterogeneous computing system includes a base processor that may form a processing unit and is coupled with a first processing unit and a second processing unit of the at least two processing units. The base processor is typically configured to perform control functions, in particular to determining properties of the processing units, to determine processing units of the heterogeneous computing system which are suitable for performing the numerical operation, to update the function meta information in accordance with the determined properties of the processing units such as number and/or computational properties of cores of a CPU and shaders of a GPU, to load the respective compute kernels to the processing units, to (numerically) determine the expected cost (at runtime), to select the (desired) processing unit based on the determined expected costs, and/or to initiate executing the respective kernel on the selected processing unit.

For example, the base processor may host and execute a control kernel. In the following, the base processor is also referred to as control processor. In other embodiments, one, more or even all of the control functions may be performed by one of the processing units. The control functions may also be distributed among the processing units and the base processor. For example, the control kernel may have sub-kernels running on different hardware units.

Furthermore, the base processor may be one of the processing units and act as one of the processing units, respectively, even if the computational power is low compared to the (other) processing units of the heterogeneous computing system. For example, the base processor may perform the numerical operation when the number of elements stored in the runtime instance of the (first) data structure is comparatively low.

Each of the processing units may be formed by a single core CPU (central processing unit), a multicore CPU, a CPU with vector extension (such as SSE/AVX), a GPU (graphics processing unit), a CPU integrating at least one GPU, a coprocessor supporting numerical computations, a SIMD accelerator (single instruction multiple data accelerator), a microprocessor, a microcontroller such as a DSP (digital signal processor), and an FPGA (field-programmable gate array) or by a combination of one or more of those devices typically forming a so-called virtual processor.

The heterogeneous computing system is typically a heterogeneous computer including a host controller having a host processor typically forming the base processor.

In one example, the heterogeneous computer further includes a CPU and one or more GPUs each forming a respective processing unit.

The heterogeneous computing system may also be a workstation, i.e. a computer specially designed for technical, medical and/or scientific applications and/or for numeric and/or array-intensive computations. For example, the workstation may be used to analyze measured data, simulated data and/or images, in particular simulation results, scientific data, scientific images and/or medical images.

The heterogeneous computing system may however also be implemented as grid or cloud computing system with several interconnected nodes each acting as a processing unit, or even as an embedded computing system.

Those skilled in the art will recognize additional features and advantages upon reading the following detailed description, and upon viewing the accompanying drawings.

BRIEF DESCRIPTION OF THE DRAWINGS

The components in the figures are not necessarily to scale, instead emphasis is placed upon illustrating the principles of the invention. Moreover, in the figures, like reference numerals designate corresponding parts. In the drawings:

FIG. 1 illustrates a computer-implemented method according to an embodiment;

FIG. 2 illustrates a computer-implemented method according to an embodiment;

FIG. 3 illustrates a computer-implemented method according to embodiments;

FIG. 10 illustrates method steps of a computer-implemented method according to an embodiment.

DETAILED DESCRIPTION

Figure 4:
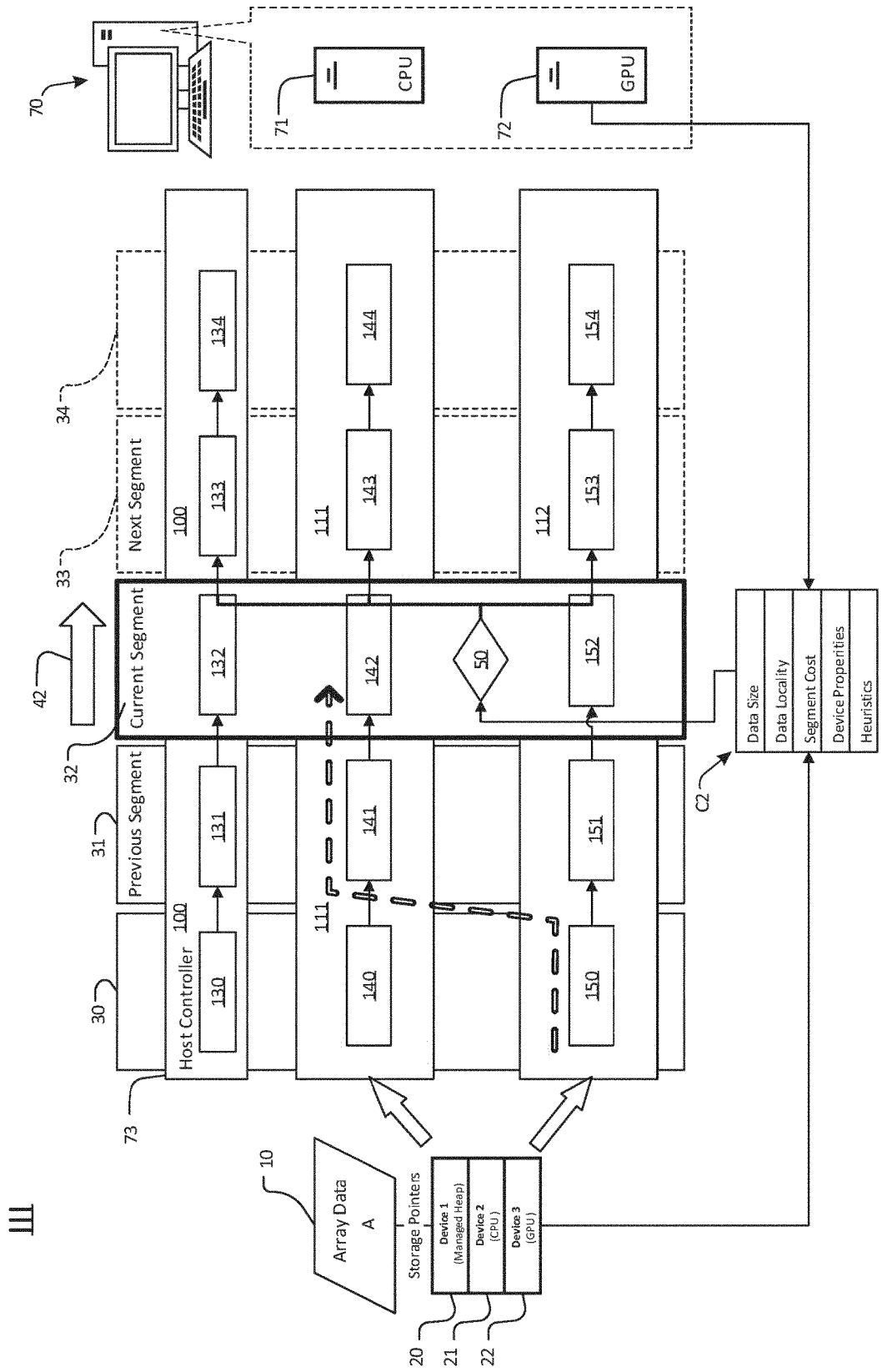
FIG. 4 illustrates method steps of a computer-implemented method and a heterogeneous computing system according to an embodiment.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Reference will now be made in detail to various embodiments, one or more examples of which are illustrated in the figures. Each example is provided by way of explanation and is not meant as a limitation of the invention. For example, features illustrated or described as part of one embodiment can be used on or in conjunction with other embodiments to yield yet a further embodiment. It is intended that the present invention includes such modifications and variations. The examples are described using specific language which should not be construed as limiting the scope of the appending claims. The drawings are not scaled and are for illustrative purposes only. For clarity, the same elements or manufacturing steps have been designated by the same references in the different drawings if not stated otherwise.

With regard to FIG. 1 method steps of a computer-implemented method 1000 are explained.

In a block 1300 of a start-up phase II, processing units of a heterogeneous computing system are initialized with respective compute kernels of a runtime segment compiled from a (higher level) program segment configured to receive a first data structure capable of storing multiple elements of a common data type. This may include copying the compute kernel to a memory of the respective processing unit or a shared memory of the heterogeneous computing system, and/or allocating the compute kernels on the respective processing unit.

Each compute kernel may be configured to perform a numerical operation derived from the program segment.

The runtime segment typically includes or has access to a function meta information including data related to and/or representing a size of an output of the numerical operation, a structure of the output, and/or an effort for generating the output.

In a subsequent block 1500 of a runtime phase III, the function meta information and a data meta information of a runtime instance of the first data structure are used to determine, typically to calculate respective expected costs of executing the compute kernels on the processing units. The data meta information may include a runtime size information of the runtime instance, a runtime (storage) location information of the runtime instance, and/or a runtime type information of the runtime instance.

For this purpose, a runtime instance of the data structure stored in a memory of one of the processing units or a shared memory of the heterogeneous computing system may be accessed by the control code of the runtime segment.

In a subsequent block 1600 of the runtime phase III, the expected costs may be used to decide on which of the processing units the respective compute kernel is executed to perform the numerical operation with the runtime instance.

Thereafter, the runtime instance may be copied to the processing unit selected for execution if the selected processing unit has not yet access to the runtime instance.

Thereafter, the compute kernel may be executed on the selected processing unit.

With regard to FIG. 2 method steps of a computer-implemented method 2000 are explained. Method 2000 is similar to the method 1000 explained above with regard to FIG. 1.

As illustrated in FIG. 2, a compile phase I may be used prior to the start-up phase II for identifying program segments in a program code and to compile runtime segments for the identified program segments in a block 2100.

Further, processing units which are suitable for performing the numerical operation derived from the identified program segments are typically determined in a block 2200 of the start-up phase II of method 2000.

In a subsequent block 2300 of the start-up phase II, the determined processing units are initialized with respective compute kernels of the runtime segments.

In a subsequent block 2400 of the runtime phase III, data meta information of a runtime instance of the first data structure are determined. This may include determining a dimension of the first data structure, determining a number of stored elements in each of dimensions of the first data structure, determining a number of stored elements in the first data structure, determining the data type of the elements, determine a type information of the runtime instance, and/or determining a runtime location information of the runtime instance.

The latter may be facilitated if the runtime location information is stored within the runtime instance of the first data structure.

In embodiments in which the numerical operation uses two or more data structures as inputs, data meta information may be determined for all runtime instances in block 2400.

In a subsequent block 2500, the function meta information and the data meta information of the runtime instance(s) are used to determine respective expected costs of executing the kernels on the processing units.

In a subsequent block 2600 of the runtime phase III, the expected costs may be used to select a processing unit for executing the respective kernel to perform the numerical operation with the runtime instance(s).

Thereafter, the (respective) compute kernel may be executed on the selected processing unit in a block 2700.

As indicated by the dashed arrow in FIG. 2, the blocks 2400 to 2700 may be executed in a loop if several runtime segments are to be executed.

Optionally, out of order execution schemes may be implemented.

With regard to FIG. 3 method steps of a computer-implemented method 3000 are explained. Method 3000 is similar to the method 2000 explained above with regard to FIG. 2.

Method 3000 starts with a block 3110 for identifying a sequence with program segments in a program code. For this purpose, a parser may be used to search for numerical operations in the program code.

In a subsequent block 3150, several subsequent runtime segments may be created. Each runtime segment may be configured to receive one or more data structures storing multiple elements of a respective common data type that may be the same or not. Further, each runtime segment may include a respective function meta information comprising data related to a size of one or more outputs of the numerical operation, a structure or shape of the output(s), and/or an effort for generating the output(s).

In a subsequent block 3170 of compile phase I, each program segment may be translated into an intermediate representation. This may be done using a compiler infrastructure.

Each runtime segment may include the respective intermediate representation and respective function meta information referring to a respective numerical operation to be performed with the runtime instances of one or more data structures.

The intermediate representation may also be created from or using meta data stored with or referring to the sequence or the corresponding program segments.

In a subsequent block 3200 of a start-up phase II of method 3000, processing units which are suitable for performing the numerical operation derived from the identified program segments are typically determined.

In a subsequent block 3270 of the start-up phase II, the intermediate representations may be compiled into respective machine language representations (compute kernels). This may be achieved using a Just-in-time-Compiler which may or may not be specialized for the available corresponding processing unit and may facilitate better customizing the machine language and/or the intermediated representation to the properties of the available processing units.

In a subsequent block 3300 of the start-up phase II, the determined processing units are initialized with respective compute kernels formed in block 3270.

In a subsequent block 3400 of the runtime phase III, data meta information of a runtime instance(s) of data structure(s) may be determined.

In a subsequent block 3500, the function meta information and the data meta information of the runtime instance(s) may be used to determine respective expected costs of executing the kernels on the processing units.

In a subsequent block 3600 of the runtime phase III, the expected costs determined in block 3500 may be used to select a processing unit for executing the respective kernel to perform the numerical operation with the runtime instance(s).

Thereafter, the compute kernel may be executed on the selected processing unit in a block 3700.

The dashed arrow in FIG. 3 indicates that the blocks 3400 to 3700 may be executed in a loop if several runtime segments are to be executed.

In another embodiment, block 3600 is replaced by a block in which the expected costs are used to distribute the workload of executing the compute kernel and the numerical operation of the compute kernels, respectively, over at least two processing units which may perform the respective numerical operations on respective portions of the runtime instance in a replacement block for block 3700.

FIG. 4 illustrates exemplary components of a heterogeneous computing system implemented as a heterogeneous computer 70 and typical processes of executing a sequence of runtime segments at a runtime phase III of a computer-implemented method 4000. Typically, a compile phase (I) and a start-up phase (II) similar as explained above with regard to FIG. 1 to FIG. 3 precede the runtime phase III of method 4000.

In the exemplary embodiment, the heterogeneous computer 70 is equipped with a CPU 71 also forming a main or host processor of a host controller 73 and a GPU 72.

A complex user program is partitioned into sequences which are segmented into segments. The segments may be continuously lined up in the order derived from the sequence.

In FIG. 4, numerals are only provided for the subsequent runtime segments 30 to 34 which represent a continuous part of the original sequence.

In the startup phase (when the program starts executing) each processing unit 71, 72, 73 found to be capable of handling a sequence has been initialized for handling all runtime segments 30 to 34 of the sequence. In the following, the processing units are also referred to as devices (device 3, device 2, and device 1 respectively).

Therefore, respective compute kernels corresponding to the runtime segments 30-34 of the sequence were compiled and allocated on each device. Kernels 140 to 144 were compiled for and allocated on the CPU 71. The compiled kernels 140 to 144 form an executable representation 111 of the original sequence on the CPU.

Likewise, compute kernels 150 to 154 of the same runtime segments were compiled and allocated on the GPU 72 and form an executable representation 112 of the original sequence on the GPU 72.

In addition to this, scalar compute kernels 130 to 134 representing a scalar version of the code of the segments may be prepared for each runtime segment. Scalar compute kernels 130-134 mostly run on the CPU, using the same host language the program was provided in. The scalar code kernels 130 to 134 form a representation 100 of the original sequence on the CPU but are adapted, typically optimized for scalar input data and/or sequential processing of—typically relatively small—instances of input data structures.

Each of the runtime segments 30-34 may store a reference to the corresponding compiled and allocated compute kernels 130-154—at least one for each of the determined devices—which can be used to trigger its execution at any time.

At the end of the start-up phase all segments of a sequence may store one reference to an executable version of the program segments for each device supported.

In the exemplary embodiment, each segment is able to execute its code in three different ways with very low overhead: one version for scalar data (for device 1 and the host controller 73, respectively), one array version for running on the CPU (71 and device 2) and one version for running on the GPU (72 and device 3).

Each segment 30-31 may implement a control code 50 which is used to switch the execution path at runtime to select one of the prepared execution paths. The execution path is illustrated in FIG. 4 as thick dashed arrow.

The decision which path is to be used for execution is typically based on multiple factors, like the data size, data shape, and data locality, the computational costs of the segments' individual execution paths, the properties of the devices, the current utilization of the devices, heuristics or measurement data about additional overhead associated with each device, heuristics about fixed or dynamic thresholds associated with data sizes. The decision which path is to be used may further depend on previous and/or successive segments, and the data locality configuration corresponding to a lowest execution time for these segments. Associated information may also be obtained by means of historical usage data of the segment and/or by speculative processing analysis and/or -evaluation.

As explained above, the best execution path may be found to be the one which finishes the execution of the segment code earliest or which uses lowest power during the execution. This is explained in more detail below.

When the execution of the sequence progresses through the segments in direction of time 42, the execution path of the sequence may switch quickly between any of the prepared devices.

Any input array arguments 10 are to be provided to each segment for execution.

Each array object (runtime instance) A may track the locations (device memory) its data has been copied to. When the array A was first used on a device 71, 72, its data are typically copied to the device memory and a reference 20-22 to the array A is typically stored with the array A. In doing so, data transfer between the devices can be minimized when the array A is used several times as input argument.

When an array is used as result storage for a segment on a device, this device may be marked in the array as the only device the array is currently stored on. Any other device locations the array may have been copied to are cleared from a list of array locations of the array.

Figure 5:
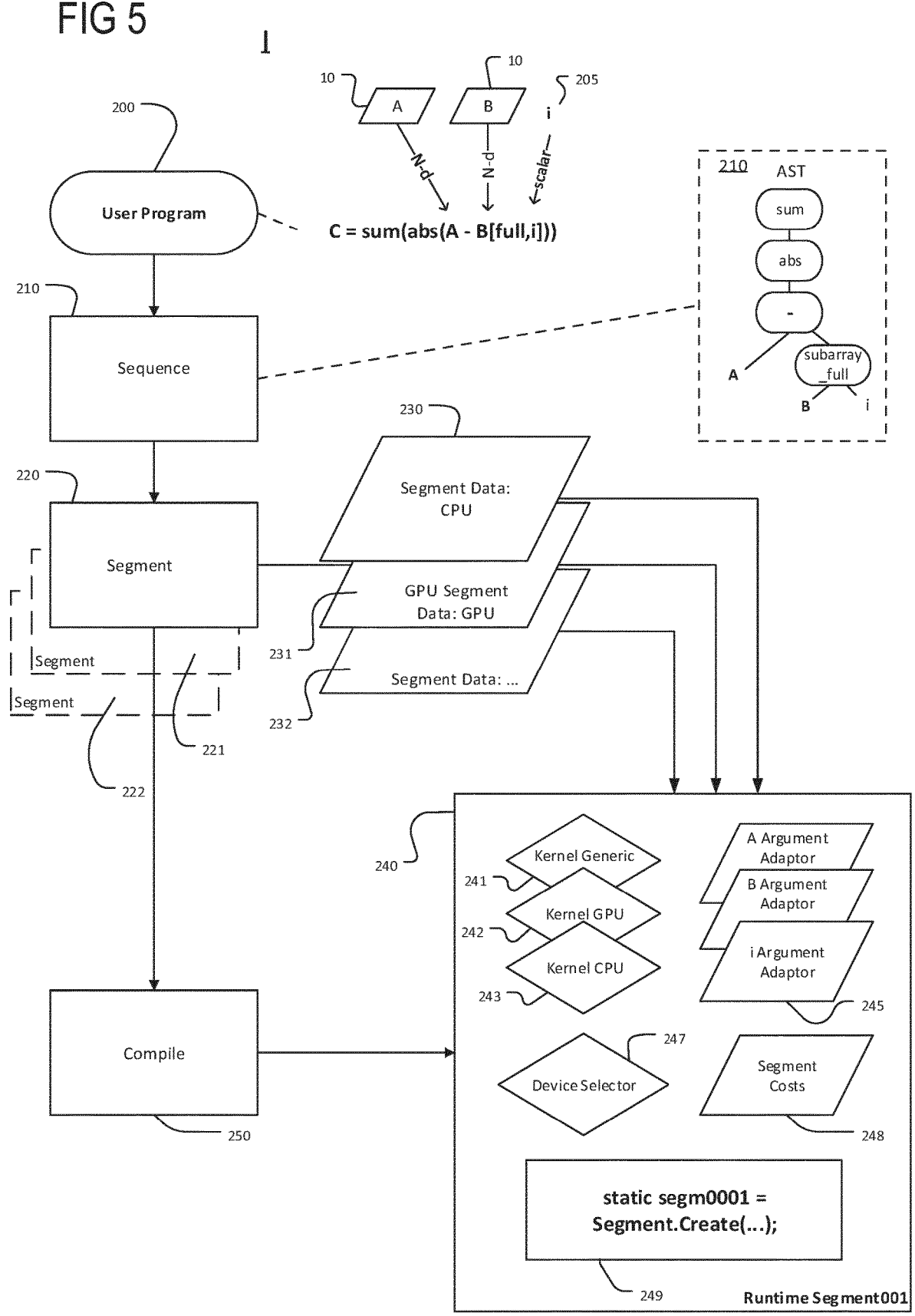
FIG. 5 illustrates method steps of a computer-implemented method according to embodiments.

With regard to FIG. 5, further processes of a compiler phase I which may be used in any of the methods explained above with regard to FIGS. 2 and 3 are explained.

In a first process, a user program 200 is analyzed. Sequences of the program 200 are identified which allow a determination of execution cost at runtime. For sake of clarity, the exemplary user program has only one sequence 210.

Sequences may include or even consist out of simple instructions dealing with scalar data 205. In this case, a compiler may derive cost information based solely on the executable code generated for the instruction.

Alternatively or in addition, the sequence 210 may have more complex instructions, potentially dealing with more complex numerical operations and/or one or more data structures 10 capable of storing multiple elements of respective common data type.

Such data structures may be any predefined array data type available to users of the language used to write the program 200 in. Alternatively, the data structure may originate from a library or a stand-alone module or an external module (dynamic link library/statically linked library) which is imported to the program. Such data structure are typically able to store multiple elements of the same or similar data type and accompanying information about the data structure, like the number of elements, the number and lengths of individual dimensions in the data structure (as the 'shape' for arrays and rectilinear arrays), the type of elements for such languages supporting types and locality information (storage place(s)).

Further, the data structure 10 may encapsulate a more general data structure to enable adding necessary information about the general data structure and making it available as a common data structure 10 if the general data structure does not provide this information naturally.

At least parts of the user program 200 are composed out of instructions performing numerical operations on data structure(s) 10. Such instructions are either known to the compiler or provide a way to become recognized by the compiler in an automated way.

One example for such instructions is the set of functions in technical languages such as Matlab (The MathWorks Inc.), numpy (numpy.org), ILNumerics (ILNumerics GmbH), Julia (julialang.org), Fortran, Scilab (scilab.org), Octave, FreeMat (freemat.sf.net), and Mathematica (Wolfram Research) working on array data. Such languages may provide their own compiler and development infrastructure. Or the language might be realized as a domain specific language extension (DSL) of another, typically more general language (GPL), may or may not exploiting, in full or partially the compiler and development tools of the GPL. Here, the data structure 10 may be realized as a rectilinear array of arbitrary size and dimensionality. Some of these functions take one or more arrays of elements (multivalued input parameter) and perform their operation on many or even all elements of the parameter(s), as map (performing a function on the elements), sin (computing the sinus of the elements), add (adding elements of two arrays). Other functions may create one or more new array data based on zero or more array or scalar input parameters, like 'zeros' (creating an array of zero-valued elements), 'ones' (creating arrays of 1-valued elements), 'rand' (creating arrays of random valued elements), 'clone' (creating a copy of another array). Other typical functions perform aggregation, like 'reduce (performing an aggregation function on a dimension of an array), 'sum' (summing the elements along a specific dimension), 'max' (computing the maximum value along a dimension). Other functions may create subarrays from data structures or perform concatenation, like, for example, 'verticat' and 'concat' (concatenating arrays along a specific dimension). Further, more complex operations may be used, e.g. 'matmult' (matrix multiplication), 'linsolve' (solving linear equation systems), 'svd' (singular value decomposition), 'qr' (QR matrix decomposition), 'fft' (performing a fast fourier transform), 'eig' (eigenvalue/eigenvector decomposition), 'interpolate' (interpolation of new values according to known discrete values), 'fmin' (finding the minimum of a function).

Functions may utilize additional supplementary parameters, e.g. to control the operations within. One example is the 'sum(A,1)' function, where '1' is a supplementary scalar parameter determining the index of the dimension of the input array A to sum the elements contained along. Some functions produce a single output array of the same type and the same size than the input array(s). Other functions may produce multiple outputs, some of the output arguments may differ in size or type, e.g. the broadcasting binary function 'add', 'find' (locating nonzero elements), 'max(A,1,1)' (locating elements with the maximum value along dimension '1' in A and also give the indices of such elements). Yet other functions may generate new arrays from scratch or by extracting parts of and/or modifying parts of input array(s). One example of latter function category is a modifying (left side) subarray operator expression like A[2;:]=B, where the values of B are assigned to corresponding elements of A, stored along the row with index '2'.

Another example of identifiable instructions in the user program 200 is the set of functions similarly provided as runtime supplement for languages like FORTRAN, C/C++, Perl, C#, Visual Basic, F#, python, Javascript. One such exemplary set of functions is described by the static functional members of the .NET CLI class System.Math. It contains, but is not limited to, the range of functions whose names starting with: Abs, Acos, Asin, Atan, Atan2, Ceiling, Cos, Cosh and ending with Sin, Sinh, Sqrt, Tan, Tanh, Truncate. Due to the scalar nature of such functions the compiler of the method described may detect common language looping construct patterns in the user code (for, while, goto- loops) in order to transform iterations over elements of arrays into single array function calls, suitable to be processed into program segments according to the method described.

One embodiment of the disclosed method may be implemented in a dynamically typed language (e.g. duck typing) such as Python, Julia or MATLAB. However, it is expected to achieve better runtime performance with an implementation utilizing a statically typed language such as C# or Java. Both, embodiments implemented in a statically typed language and such embodiments implemented in a dynamically typed language are applicable to both categories of programs: statically typed programs and dynamically typed programs. If the program is statically typed and the disclosed method is implemented in a dynamically typed language type information about the data and functions of the program may be omitted. Correspondingly, if the program is provided in a dynamically typed language and the disclosed method is implemented in a statically typed language, missing type information are inferred from the program by the compiler or by a runtime framework supporting the execution at runtime. Therefore, the same mechanism may be used which facilitates the determination of the final types (as used directly for execution) in the language compiler and/or runtime execution framework supplementing the langue of the original dynamically typed program. Alternatively, a compiler may inspect the program code and infers the type of data structure elements and program segments from program code expressions (e.g. constants), markups (attributes, type declarations) found in the code or at compiled binary representations of the program segments or in supplementing materials, from a list of default types available to the compiler and/or from consecutive program segments or other program context.

The sequence 210 of instructions may have been created by the user. The compiler may combine individual instructions of the sequence 210 to form program segments 220-222 of known instructions. The primary goal of such grouping (combining) is to improve execution performance. In this case the numeric costs of the program segments 220 may automatically be derived by the compiler based on the cost functions of the individual instructions grouped into the program segment as described below.

Alternatively, a program segment 220 may contain a single array instruction only.

In the exemplary embodiment of FIG. 5, the sequence 210 consists of three program segments 220-222.

When a part of the user program 200 is not identifiable by the compiler as a known instruction, the current program sequence 210 may be ended and a new program sequence is started with the next identifiable instruction.

In the exemplary embodiment, the sequence 210 consists out of the full program line of code in the user program 200, with two input arrays A, B and one supplementary scalar input i:

$$C = \text{sum}(\text{abs}(A - B[\text{full}, i]))$$

Since all instructions (sum, abs, minus, subarray) are known to the compiler, a single sequence is created from the whole program line. In this case the assignment '=' is included into the sequence generated.

In other embodiments, assignments may be excluded from or multiple assignments may be included in program segments. This allows the program segments to span an arbitrary number of instructions, instruction lines and instruction sections.

Further, the program segments may or may not include control structures and/or looping constructs. In any such cases a sequence boundary may be created once the compiler identifies one of the restricted language constructs.

Even further, marks in the user program 200 may also indicate boundaries of sequences or program segments. Such marks may be created by the user or by an automated process. For example, a pre-processor might analyze the program code 200 and create and store marks with the program to indicate hints to the subsequent compilation steps.

Alternatively and/or in addition, the user may edit, create, use and/or store marks, for example in the form of language attributes to provide information to the compiler to support or to control the identification, segmentation of and/or the extraction of required metadata about a user provided function or program. The compiler may however also ignore some or even all marks.

The process of dividing the program 200 into sequences 210 and dividing sequences 210 into program segments 220-222 may involve the creation of a graph data structure representing the sequence to be identified.

The tree may be created as an abstract syntax tree (AST) in which case it holds all information necessary to identify data dependencies and program flow of the instructions and corresponding data in the sequence. This information in the graph together with accompanying information such as metadata of the functions may also be used to decide for program segment boundaries and/or to compute program segment costs, program segment parameter set, and/or program segment output size.

In order to achieve a high efficiency during execution, the compiler will typically try to maximize the number of instructions merged into a program segment. This increases the segments complexity and workload and often leads to better utilization of the processing units by minimizing overhead for transitioning between segments and storage/transfer costs of intermediate results.

For example, the compiler may try to increase the size of program segments by iteratively combining neighboring instructions in the program code until at least one certain limit is reached and the addition of further instructions to the new segment is stopped. Such limit may be established by a compiler specific rule (heuristic) or compiler specific limit relating to the complexity of the combined operation for the new segments, the number and/or type or structure of input/output parameters of the new segment, the ability of the compiler logic to create/derive required function meta information (as function size and function effort) as a functional of the properties of input/output data structures of the segment based on meta information of the combined instructions, and/or the ability to create an intermediate representation of a compute kernel representing the combined numerical operation from the individual instructions.

Another way to define program segment borders with combined instructions is to categorize the set of known instructions into instructions which do not cause a change of size for any output parameter in relation to the input parameter sizes (map-type instructions) and further instructions which potentially do cause a change of the size of at least one output parameter in relation to the input parameter sizes (reduce-type instructions, subarray, and creational instructions). According to an embodiment, a program segment includes at most one size changing instruction including any number of known map-type instructions, derived from direct neighbors of the size changing instruction in the user program code.

A method of supporting the decision for program segment border placement which a person experienced in the art will find especially helpful is to limit the complexity (cost) of determining the effort to execute the computing kernels of a segment with instances of input/output data structures at runtime for each processing unit. According to an embodiment, such effort is computed by functionals derived from the segment function meta information which are created/adopted when new instructions are added to a program segment at compile time during segmentation (see below). The complexity of such effort functions is typically not increased when map-type computing instructions are added to the segment. Other types of instructions may lead to a more complex cost function, requiring higher effort for evaluation at runtime. In order to keep the overhead of deciding for a processing unit for a segment small the compiler may place a segment border whenever the addition of a new instruction would increase the complexity or the effort for evaluating the cost of a program segment.

In order to locate supported instructions, a semantic analysis may be performed on the program or on parts thereof. The goal of such analysis may be to determine the type, or other information of the instruction and/or of the data the instruction is handling.

Alternatively and/or in addition, simple text matching may be performed on tokens of the program 200.

Semantic analysis may also be used to infer data types when the program 200 does not provide sufficient type information directly. One example refers to the collection of dynamically or weakly typed languages and/or structures which are common for technical prototyping languages.

During the compilation phase I, a runtime segment 240 for each program segment identified is typically created. The runtime segment(s) 240 typically store(s) all information required to execute the numerical operation of the program segment 220 on the processing units (71, 72, 73) at runtime.

In one embodiment the runtime segment 240 is realized as a compiler generated class definition 249 which is going to be instantiated at startup time II. Typically, the class stores the intermediate representation of the numerical operation for supported device categories (kernels 241, 242, 243), argument adaptors 245 facilitating the determination, caching and loading of array arguments for the segments computational kernels 241-243, the function meta information 248 for the (combined) instructions of the segment and a device selector code 247 which contains code performing the determination of processing costs and the selection of the processing unit at runtime. The device selector 247 may serve as the entry point of the runtime segment 240, 249 when the program is executed. Therefore, the device selector 247 may provide a function interface supporting the same number and the same types of input and output arguments as the program segment 220. This enables the compiler to use the device selector 247 as a direct substitution for the instructions the program segment 220 is made out of.

The substitution may be realized via code injection by modification of the program code 200 or by modification of a compiled assembly (executable binary) derived from the user program 200.

The implementation of the runtime segments may be realized as a separate module, assembly, library, remote service or local service. Alternatively, the runtime segments code might be added to the user program 200.

In one embodiment the startup phase I may be implemented and triggered by instantiating the runtime segment 249 as a static context variable in the program. During the startup phase I, information about the available processing units (73, 71, 72) is collected, the intermediate representations 241, 242, 243 of the program segment 220 are adjusted for each supported processing unit (73, 71, 72), the computing kernels are compiled and loaded to the processing units (73, 71, 72).

Alternatively or additionally, some of the initialization steps for some of the resources described above may be delayed to the time the utilization of the corresponding resources is required for the first time during the execution.

As explained above, the cost of executing each individual segment is determinable at runtime. In difference to other approaches the compiler does not attempt to determine the actual cost of an instruction at compile time or prior to allocating the segment on devices (processing units) of the heterogeneous computing system. Instead, all devices are similarly equipped with executable runtime segment(s) and the expected costs are determined at runtime, typically right before execution.

The expected cost of a runtime segment is typically evaluated based on a cost function taking into account the intrinsic cost of the instructions executable representation on a specific processing unit and the concrete data dealt with by the numerical operation derived from the instructions of the program segment.

Intrinsic segment costs may be derived from the cost of each single instruction in the program segment utilizing the graph of instructions of the corresponding sequence 210. The costs of individual instructions may be combined in a suitable manner to represent the intrinsic cost of the whole segment in a way enabling efficient evaluation at runtime.

Such a representation 248 may be stored with a runtime segment 240 and used at runtime to determine the actual cost of executing the runtime segment compiled from the program segment 220 for the concrete input data structure 10.

Therefore, the computational cost of a runtime segment is a function of such input arguments and may be implemented in different ways. For example, the compiler may utilize several ways to provide the cost function to the runtime segment, some of which are described below.

Typically, the compiler 250 will pick a cost function implementation which is expected to result in best execution performance or lowest power consumption at runtime. Such selection often corresponds to the least number of information required to obtain at runtime.

For many instructions the cost function can be determined in terms of the number of operations performed to produce a single element C in the output. The overall cost may than be the result of multiplying the cost of a single element C with a factor N, where N corresponds to the number of output elements (to be) produced or a certain power thereof, depending on the effort of the instruction.

For simple operations like sin(A), N would equal the number of elements in the input array A. For an instruction sorting an array A with an effort of $O(n^2)$, N would be equal to the square of the number of elements (n) in A. Other instructions may have higher or lower efforts, leading to other powers, including non-integer powers.

The computational cost for a single element C can be acquired from lookup tables or caches, be determined by measurements, for example on the concrete hardware used to execute the instruction or by analyzing the compute kernel of a runtime segment resulting from a compilation of the instruction for a specific processing unit (CPU, GPU etc.) of a heterogeneous computing system.

Other instructions may have more complex cost functions. For example the cost function may depend not only on the number of elements in the output result but also on the number of dimensions and/or the structure (i.e.: the lengths of individual dimensions) of at least one input argument (i.e. runtime instance(s) of respective data structures), the value of elements in at least one input argument, the existence, structure, type, value of other input parameters and/or output parameters and/or the existence and value of supplementary parameters.

The information of the cost function may also be automatically derived from the instruction by the compiler 250. Automatic derivation of the cost may involve analyzing the function and is especially useful for simple instructions. The compiler 250 may use at least one of the code, the name, the varying number of parameters, and/or the executable binary representation of the instruction in order to automatically derive the cost of the function.

Alternatively and/or in addition, supplementary metadata associated with the function, suitable to evaluate the computational cost at runtime may be used by the compiler. Such metadata may be created during the authoring of the function. By agreeing on a specified set and/or format of such metadata, the programmer of the program 200 may extend the collection of supported instructions with own functions and/or operations.

The compiler 250 may also know a predefined set of instructions and associated cost functions and/or may be able to match instructions in the program code with the cost function of the known instructions.

The compiler 250 may decide to combine the cost functions of corresponding instructions into a single segment cost function or to replace the cost function for individual or for all combined instructions with a replacement cost function similarly representing the effort of the segment for a certain instance of the input data structures.

Alternatively, the segment cost function may be implemented and/or evaluated by considering the cost functions of all individual instructions in the segment. This may be realized by walking the nodes of the sequence graph 210 and evaluating the cost function of each node representing an instruction.

Further, the compiler 250 may apply optimizations in order to simplify the resulting cost function(s). Such optimizations may include the inlining of instruction cost function, the omitting of such parameters which do not (significantly) contribute to improving the quality/exactness of the cost value for a segment, partial or complete aggregation of instructions in a segment and other methods which reduce the computational overhead of evaluating a segment cost function at runtime. For example, if the compiler 250 identifies for a program segment that the cost do solely rely on the number of elements in its input parameter In0 other information as, for example the number of dimensions and/or the structure of the input parameter In0 may be omitted from the resulting cost function.

According to an embodiment, instruction information is provided by metadata attributes. Each instruction may provide a way to query metadata for the instruction to the compiler. For example, every suitable ILNumerics function is decorated with a certain attribute that supports the compiler in identifying the function as an instruction. Accordingly, the attribute type is known to the compiler and can be used to provide comprehensive metadata of the function via a common interface implemented by the attribute type.

The function metadata typically contain data for determining the size and the structure of each generated instance of output data structures that may be an array, data for determining the 'effort' the instruction (numerical operation) spends for generating an instance of an output data structure, and optional data for deriving kernel code for a specific processing unit and/or a generic processing unit type, the processing units being suitable for performing the numerical operation on a set of instances of input data structures.

The above supporting function metadata is typically provided individually for each output the instruction is able to produce and for each type of processing unit the framework supports.

For example, the high-level ILNumerics function abs(In0) for calculating absolute or magnitude element values of instances of input data In0 is decorated with an ILAcceleratorMetadata-attribute which contains a link to a class ILMetadata_abs001. Both are provided by the author of the abs function of the ILNumerics framework. The compiler can instantiate the class and query its interface to gather the following information: size information of instances of the output Out0 data structures produced by the abs(In0) instruction in terms of instances of input data In0. Individual size information may be provided, including but not limited to (1) the total number of elements stored in Out0 (Numel(In0)), (2) the number of dimensions used to describe the structure of Out0 (Numdim(In0)), and (3) the length (number of elements) for each dimension of Out0 (Size(In0, 0) to Size(In0, 2)) as illustrated in table I typically representing a segment size vector or list:

|  |
| --- |
| Numdim(In0) |
| Numel(In0) |
| Size(In0, 0) |
| Size(In0, 1) |
| Size(In0, 2) |

Such information is typically provided in terms of a function receiving the instance of the input data structure In0 and producing a vector (size descriptor) with the size information stored as consecutive elements. Since there is only one output produced by abs(In0) the exemplary ILMetadata_ abs001 class provides a single size descriptor only. Depending on the kind of instruction the size descriptor function may requires further arguments, corresponding to the number of arguments defined for the instruction. For example, the add(In0, In1) instruction adding the elements of two input arrays requires two array arguments which may or may not are required for, provided to and used by the size descriptor function.

Further provided as function meta information of the abs(In0) instruction may be the 'effort' of the instruction in terms of instances of its input data In0, on a (generalized) CPU platform, relating individually to (1) the number of elements in In0, (2) the number of dimensions in In0, (3) the length of each dimension of In0.

Such effort information may be provided as normalized values or constants forming an effort vector of floating point or integer values. Each element of the effort vector corresponds to information of the elements of a size descriptor vector such that when performing a vector product (i.e.: computing the scalar product) on both, the effort information vector typically describing the normalized effort for the instruction (i.e. effort per element of the input data structure) and the size descriptor vector corresponding to the instance of the input data structure the resulting value corresponds to the effort of executing the instruction with the instance of input data structure.

Likewise, the 'effort' of the abs(In0) function in terms of its input data In0 on a (generalized) GPU and/or any other processing unit may be provided.

Other embodiments may use other methods of providing the effort information of the instruction at runtime. Such methods can be simpler than the one described above. It may omit information from the computation or substitute some information with suitable estimates. Or the methods are more complex, taking the same and/or other properties of related entities into account. For example, the effort information may be provided as a constant instead of a function. Or the computation may take into account the values and/or the types of elements of the input data structure instances, state information of the processing unit, of the host controller and/or of other system components, further information provided by the input/output data structure instances, the function meta information and/or the compute kernels.

The function meta information may further include a template kernel code (compute kernel) suitable to be used as a template for a specialized kernel function body on a concrete CPU platform. The template is typically completed later in the program run when the concrete processing units are known. The template may contain placeholders which are going to be replaced later, for example at startup time, for example with properties of the processing unit. Such properties may include the number of processors, cores, cache size, cache line size, memory size and speed, bitrate, features and/or instruction set supported by the processing unit, power consumption and/or frequency of the processing unit.

Likewise, kernel code (compute kernel) suitable to be used as a template for a specialized kernel function body on a concrete GPU and/or any other processing unit including a host controller may be provided as part of the function meta information. Such template kernel code may be equipped with placeholders which are replaced at start-up time with properties of the concrete processing unit, like the number of processors, number of cores, cache size, cache line size, memory size and speed, bitrate, features and/or instruction set supported by the processing unit, power consumption and/or frequency of the processing unit.

The compiler 250 uses the gathered information to create a runtime segment. The runtime segments may contain executable code in the same language the user program was made of. The compiler 250 may modify the program code in a way which causes the execution of the runtime segment instead of the original program part the segment was derived from.

Alternatively, the compiler may create executable instructions compatible with the execution system and/or modify an executable resource created from the user program 200 to cause the execution of the runtime segment instead of the corresponding part of the user program 200 at runtime.

A runtime segment may span a single instruction identified. In this case the segment effort (explained below) corresponds to the instruction effort and the segment size (explained below) corresponds to the instruction size. In other cases a segment may span multiple instructions and the segment size and effort are computed from the set of multiple instruction efforts and -sizes. See below for a description of the creation of segment effort and -size.

The runtime segment may implement multiple execution paths for the original intent of the instructions. One path executes the runtime segment on the CPU, potentially utilizing the same runtime system the program code was made for. Other paths may use low-level accelerating interfaces, like OpenCL or CUDA or OpenGL etc. to execute the runtime segment on an accelerating device, like a GPU or similar. Optionally, a fast track is provided for scalar or small input structures. All paths are readily initialized by preloading respective compute kernels to the corresponding processing units, even though such loading may be performed in a lazy manner at the time when a compute kernel is to be executed for the first time.

At runtime in one embodiment, the decision which path (which device) is to be used for fastest/most efficient result creation often only depends on dynamic runtime data, for example the data meta information, in particular the size, structure, and/or values of runtime instances of the input data structures. All other conditional information has been 'baked' into the prepared segment effort by the compiler at compile time and/or at start-up time already. This is typically especially true for such information which is known at compile- or start-up time and is not a matter of dynamic changes at runtime.

Typically, each runtime segment implements a fast switch for the dynamic decision of the execution path, based on the segment size and the segment effort.

The segment effort corresponds to the number of operations associated with the computation of a single result element by the runtime segment. Multiple efforts can exist for a runtime segment if the runtime segment is able to produce multiple output results.

Segment efforts are typically realized and/or implemented as functions of the size of the input data structure instance.

Segment efforts may carry a measure of the cost of the instructions implemented in the runtime segment and accumulated from the instructions assembling the segment. Since the way the instruction is implemented on individual platforms may differ, a segment effort is typically computed from the assembling instructions for each supported platform individually.

According to an embodiment, the segment effort is implemented as a segment effort vector of length n corresponding to the size description of a multi-dimensional array, where n corresponds to the number of dimensions maximal supported by the system incremented by 2.

Each segment effort vector SEV0, SEV1 may include or consists out of the following elements:

Element #0: effort of the function by means of the number of input dimensions,

Element #1: effort by means of the number of input elements,

. . .

Element #2 . . . (n–3): effort by means of the length of the corresponding dimension.

Elements of the segment effort vector can be numeric constants or scalar numeric functions. The compiler may be configured to decide to fill and maintain all elements of the segment effort vector, and/or to improve and/or even optimize performance by leaving out some elements from the computations depending on the properties (complexity) of the functions in the segment.

However, at least one element of the segment effort vector is non-zero.

The segment size corresponds to the size description of an n-dimensional array and may be implemented as a segment size vector of length (n+2), where n corresponds to the number of dimensions maximal supported by the system.

Typically, the segment size vector and the segment effort have the same length.

The segment size vector may include or consists out of the following elements:

Element #0: Number of dimensions (n),

Element #1: Number of elements,

. . .

Element #2 . . . (n+1): Length of dimension 1 . . . n.

The elements of the segment size vector can be numeric constants or scalar numeric functions. Typically, the elements comprise scalar functions of instances of the input data structures. Again, the compiler may (typically prior to runtime) decide to adjust and/or even optimize the segment size vector for better performance.

Figure 6:
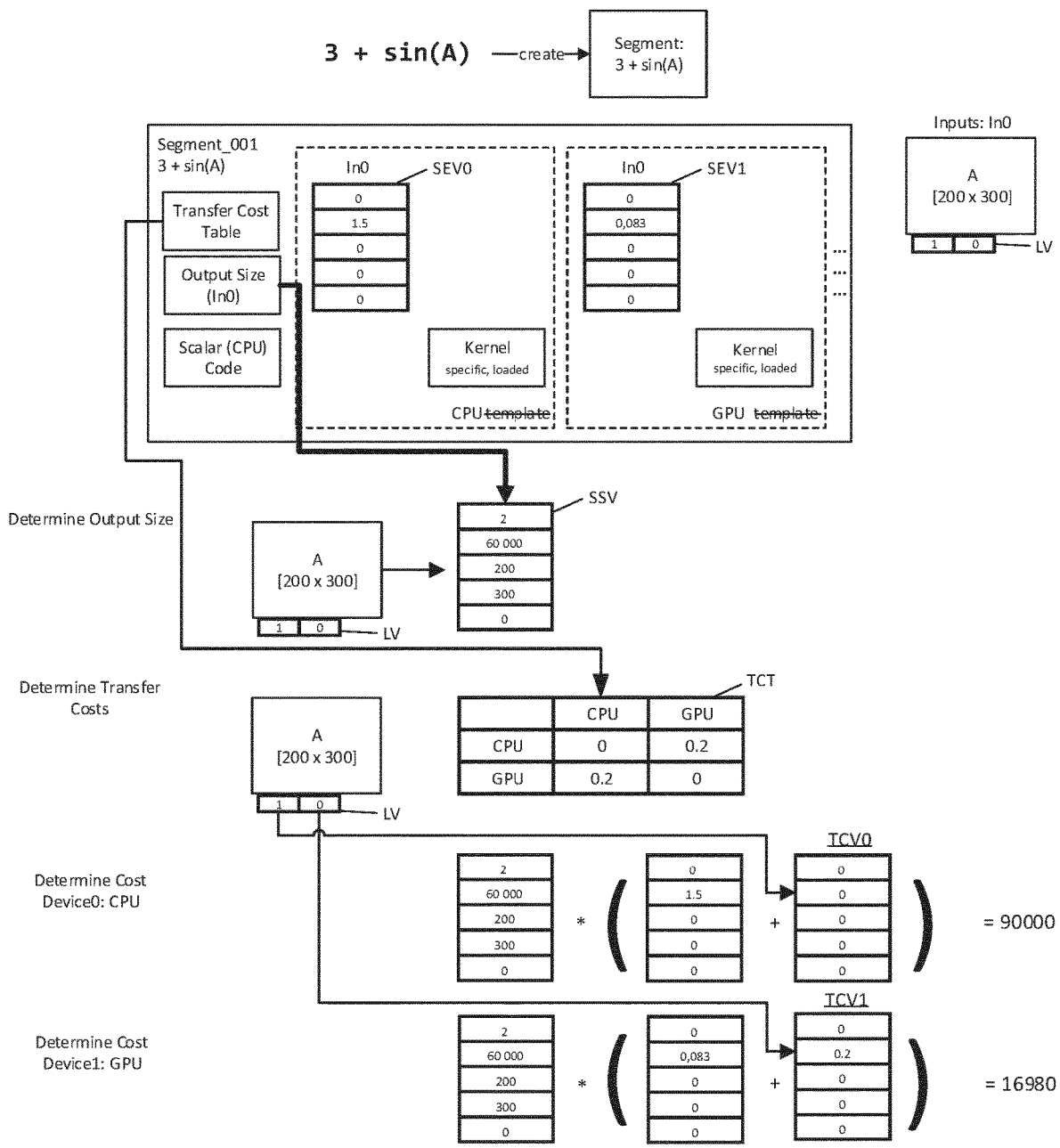
FIG. 6 illustrates method steps of a computer-implemented method according to embodiments.

With regard to FIG. 6, determining at runtime III expected costs of executing respective compute kernels of a runtime segment implementing an exemplary program segment with the function 3+sin(A) for an array instance A of 200×300 elements is explained. In the exemplary embodiment, the expected costs are determined for a heterogeneous computing system with two processing units, namely a CPU (Device0) and a GPU (Device1).

At runtime III and before executing one of the compute kernels, the desired processing unit for executing the runtime segment is selected by computing the expected costs for the execution of respective compute kernels on each available device.

First, the segment size vector SSV and the segment effort vectors SEV0, SEV1 may be determined. In the exemplary embodiment, the segment size vector SSV is implemented as explained above with regard to table I and determined in accordance with the array instance A.

For any element of the segment size vector SSV which relates to a function, the function is evaluated to obtain the element as a number. This is to be performed only once, since the size of the result of the segment outcome does not change between devices. See below on how this may be achieved.

The segment effort vector SEV0, SEV1 is typically determined for each processing unit (CPU—index 0, GPU—index 1). Any related element functions may be evaluated (see below for further detail).

Thereafter, the computational costs for each device may be determined by computing a scalar product between the segment size vector and the segment effort vector.

Thereafter, the expected (total) costs can be determined by adding computational costs and costs for a potential data transfers to each device based on the segment size vector and a current data locality information as maintained in the array object A.

Thereafter, the device corresponding to the lowest expected cost may be selected for execution.

Additionally, more information may be taken into consideration of the expected costs. For example, additional device properties (cache sizes, SIMD lane length on CPU vector extensions etc.), a factor corresponding to an overhead required for initiating data transfers (next to the actual data transfer costs), an overhead for triggering the execution of preloaded compute kernels, processor frequency, utilization of processing units and others may be considered.

Alternatively, the device selection for execution may be based on fewer information than described above.

A transfer cost table TCT is typically created at start-up time (startup phase) once all devices suitable for performing numerical operations (e.g. based on a predefined version of OpenCL) are identified. The table TCT may be cached for decreased startup overhead.

According to an embodiment, array data may live on any device (not only on the host). In order to estimate the required effort to copy data from a current device to another device for execution, the costs of the transfer may be estimated based on a transfer factor corresponding to the normalized transfer costs from the current device to the other device.

The transfer factor may be acquired by measurement at start-up or based on certain heuristics delivered with the systems.

The transfer factor may be multiplied with the actual array size at runtime.

Further, the transfer factor may be refined during the execution of the system based on actual measurement data. This can help to account for resource state changes of the runtime computing system.

According to an embodiment, location vectors LV are used. Runtime instances of data structures (arrays) may co-exist on multiple storage locations. A location vector of references to such locations is typically maintained by each array operation.

The length of the location vector LV may correspond to the number of supported devices and is typically of constant length during the execution of the program, but may vary between individual execution runs and/or computing systems.

Each of the elements of the location vector LV typically corresponds to one (fixed) device index $0, 1$ for all runtime segments. Device indices may be assigned at startup time of the program as part of the determination of the processing units.

The element values of the location vector LV may point to a reference to the data buffer on the respective device.

The elements of the location vector LV may be non-zero, if the array data are (currently) available on the device corresponding to the element index, and zero otherwise.

In the exemplary embodiment illustrated in FIG. 6, the input array A exists on the CPU device (index $0$) only as exemplarily indicated by the location vector LV=(1, 0) storing a non-zero value (1) only in the location vector LV element with index zero for the CPU. As the array A does not exist on the GPU memory, exemplary transfer costs of 0.2 per element of the input array A have to be considered for the GPU as illustrated in FIG. 6 by the transfer cost vector TCV1, while no transfer costs have to be considered for the CPU resulting in a corresponding transfer cost vector TCV0 filled with zeros.

For each processing unit, the expected costs can be determined as scalar product $SSV*(SEVi+TCVi)$ with device index i (i=0, 1).

In the exemplary embodiment, the expected costs for executing the runtime segment on the CPU are much higher than the expected costs for executing the runtime segment on the GPU (90000 compared to only 16980). Thus, the GPU may be selected for execution.

For sake of clarity, FIG. 6 only illustrates cost determination at runtime for a numerical operation (3+sin(A)) which is to be performed element by element resulting (for the exemplary processing units) in segment effort vectors SEV0, SEV1 each having only one non-zero element (namely the second one referring to costs depending on the total number of stored elements).

Further embodiments of computing segment effort vectors and the segment size vector are explained in the following with regard to FIGS. 7 to 9 describing the exemplary creation of the function meta information attached to a segment performing the operation 3+sin(A).

For good performance, it may be preferred to merge multiple instructions to form a single merged segment. Several options may exist to perform the merge and to provide the overall segment size and segment effort to be available at runtime. The methods differ in the complexity of the segments they support and in the cost to compute their information.

Figure 7:
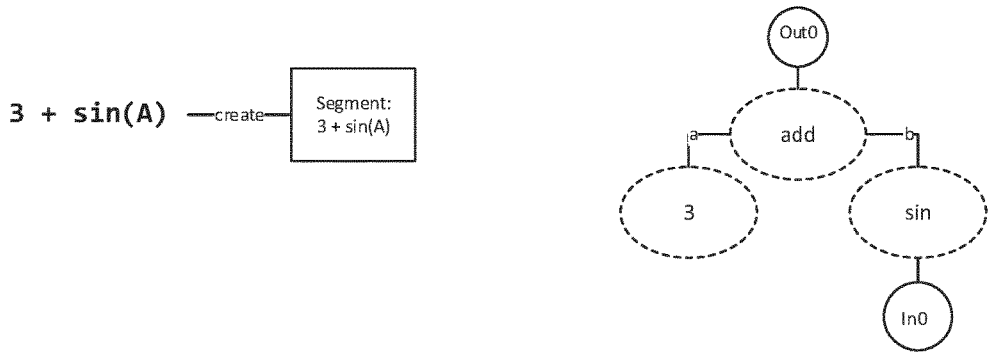
FIG. 7 illustrates method steps of a computer-implemented method according to an embodiment.

When the compiler starts building the segment at compile time, it may first identify the code tree or abstract syntax tree (AST) of the segment shown on the right of FIG. 7.

In the exemplary embodiment, the tree is relatively simple. More complex trees are supported as well. Typically, each node of the tree corresponds to an instruction of the program or to data arguments (constants, arrays). The compiler starts by walking along the nodes of the tree and querying the metadata of every instruction involved.

During the walking of the nodes the compiler may build
segment effort vectors,
segment size vectors, and
segment kernel templates
for every supported processing unit category such as generic GPU, generic CPU, CPU host, generic DSP, scalar device and so forth. Note that at this stage the effort vectors created for individual processing unit categories do not carry any information specific to concrete devices yet. Rather, the individual effort vectors account for individual ways to implement and execute the instructions on the various processing unit categories. For example, some device categories require the kernel code to also implement looping structures and/or thread management overhead in order to execute some instructions efficiently while other device categories don't.

The segment size vector has to be built only once since it does not change on individual processing units.

Every output slot of the segment may get its own segment size vector assigned. Depending on the complexity of the instructions dealt with in the AST results produced by individual output slots of the segment may correspond to individual computational costs. Some embodiments take such differences into account by maintaining individual effort vectors for individual outputs of a segment. However, for the sake of clarity this description assumes the segments to be sufficiently simple so that all outputs are created for every execution of the segment at once, hence a single effort vector for each processing unit (category) is able to represent the actual computational costs for all outputs.

Instructions in a segment which do not change the size of its inputs may be aggregated into a single size function. Segments comprising such instructions which do not change the size of its inputs typically only get a size function vector which reflects the size descriptor of the corresponding input assigned to the output slot.

Otherwise, the final segment size of each output slot may be realized as a tree of "size-changing nodes" corresponding to the segment syntax tree. Every node size function may modify the size of its input(s) accordingly and 'generates' a new size which serves as the input for the size function of its parent node.

The size tree described above is typically stored in the segment for later evaluation. The size information may be adjusted and/or even optimized by the compiler and/or stored in a specialized format in order to facilitate more efficient segment size evaluation at runtime.

For example, the segment 3+sin(A) implements two instructions: Add( ) and Sin( ) Add( ) is a binary operator, adding the elements of two input arrays. Since one of the two arguments is the scalar constant '3' the size of the output generated by Add( ) solely depends on the size of the second input (array) argument to Add( ), according to common dimension broadcasting rules. Therefore, Add( ) is considered a non-size changing instruction here.

Likewise, the Sin( ) instruction computes the sinus of all elements in the input array. The size of the output generated by Sin( ) equals the size of the input array. Therefore, both instructions in the segment are non-size changing and the segment size corresponds to the input size.

Figure 8:
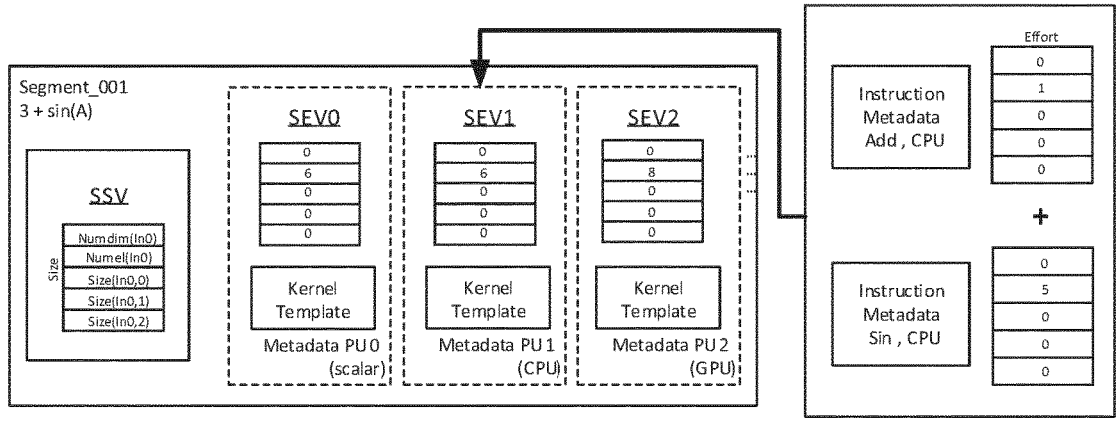
FIG. 8 illustrates method steps of a computer-implemented method according to an embodiment.
Figure 9:
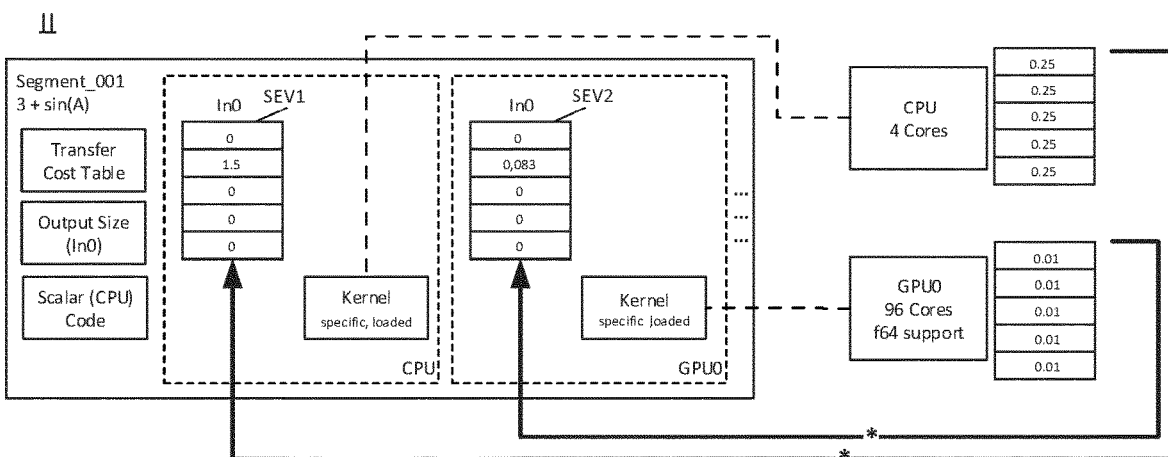
FIG. 9 illustrates method steps of a computer-implemented method according to an embodiment.

This is reflected in FIG. 8 where the segment size vector SSV of the created segment Segment_0001 for the (only) output slot Out0 corresponds to the size descriptor of the (only) input array argument In0.

Many size trees are single-node trees because many segments implement only non-size changing operations (like in the example above). Moreover, due to the sparsity of the segment effort vectors SEV0 to SEV1 referring to respective processing units PU0 to PU2 and non-size changing operators (see below), often only a scalar value evaluation is required at runtime to compute the final effort of the segment on a specific processing unit, often based on the overall number of elements in the input array only.

However, for such segments containing multiple aggregating functions (e.g. Sum( )) which change the size of input arguments, the size functions may have to be evaluated recursively at runtime, based on the tree of instructions and corresponding metadata. The compiler may decide to limit the span of functions for a segment accordingly, in order to keep the segment size evaluation simple.

The segment effort vectors SEV0 to SEV1 may be created in a similar way. Metadata of every instruction are queried by the compiler for each specific processing unit category individually. The effort for each instruction may be provided as a simple vector of scalars or of scalar functions. Typically, the segment effort vectors SEV0 to SEV1 correspond to the respective normalized instruction effort of computing a single element of the corresponding output. Note that individual processing units PU0 to PU2 may associate different efforts to compute a single output element, depending on, for example, different instruction sets being supported by the processing unit, different implementations of the intended numerical operation on the processing units, and/or different support for the required numerical element data type or numerical precision.

The effort data vectors for non-size changing array instructions are typically aggregated into a single effort vector by addition of the effort vectors of non-size changing instructions involved. FIG. 8 illustrates one embodiment, where the effort of computing a single element of the output produced by the segment 3+sin(A) is shown. Both instructions are non-size changing instructions. Hence, every element of the output requires the computation of one addition and one evaluation of the (intrinsic) sinusoidal function. The efforts for both operations may be or are provided by the author of the instruction in terms of instruction metadata and are added to form the segment effort vector.

Often, the effort of computing a single element of the output is associated with the overall number of elements to be computed. In this case and at runtime a single multiplication operation with the factors 'single element effort' and 'number of output elements' leads to an estimate of the overall segment execution effort for a certain input data structure. Often, the segment effort vector is sparse in that only a single element is non-zero, namely the element corresponding to the index of the information of the number of elements in a size descriptor.

In the exemplary embodiment illustrated in FIG. 8, the effort to create a single element is stored in the segment effort vectors SEV0 to SEV2 at index 1 ($2^{nd}$ index value), corresponding to the position where the number of elements of an array is stored in an array size descriptor and the SSV, respectively. Here, the stored value 6 is the result of adding the single element effort 1 of the Add( ) instruction and the single element effort 5 of the Sin( ) instruction. Other elements of the segment size vector are 0, indicating that the segment effort can solely be computed in terms of the overall number of elements in the input data structure at runtime.

Other segments may implement other instructions, for example the aggregating instruction Sum( ). When such instructions are involved in a segment, the corresponding instruction effort may be computed based on other size information, for example the number of dimensions or the length of individual dimensions of the input data structures.

For size changing instructions, i.e. instructions generating output arrays with a different size than the input arguments, aggregation of the instruction effort information in advance is often not easily possible. Instead the effort for creating a single output element may depend on size information corresponding to the input/output data structure instances as they are provided to individual instructions of the segment at runtime. Therefore, an effort evaluation tree may be created for these segments. Nodes of the effort evaluation tree store the effort information of the instructions involved for later evaluation.

The effort evaluation tree can be used at runtime to gather the segment effort vector of the segment for a certain set of input data structure instances. Therefore, the instruction effort functions and the instruction size functions stored in the nodes of the tree are evaluated appropriately (e.g. recursively or by walking the nodes of the tree), taking into account the concrete sizes of the data structure instances (input- and intermediate argument sizes).

This way the effort evaluation tree allows the anticipation of the effort required to compute the numerical operation of the segment on a specific processing unit with specific data structure instances based on associated metadata—without actually having to carry out the operation on the processing unit.

Typically, the instruction effort vectors are maintained by the instruction author for each device category individually. This takes into account the fact that individual devices may implement the same operation in a different manner, or the same operation causes different execution costs on individual device categories.

For improving the precision of the effort estimation result, further data may be considered, such as data related to memory transfer costs and frequencies of the processing units.

While the segment effort vectors after the compiler stage may represent the effort of creating a single element, the segment effort vectors may be further refined by taking further data into account. FIG. 9 illustrates the adoption of the segment effort vector with information about the number of cores available for two processing units, a CPU and a GPU.

In the start-up phase (e.g. at startup time) II, the number of cores of the available processing units may be determined and the predetermined segment effort vectors SEV0 to SEV2 updated accordingly. In the exemplary embodiment, the detected 4 cores for the CPU allows the execution of 4 instructions at the same time. Hence, the elements of the predetermined corresponding segment effort vector SEV1 (values 0,6,0,0,0, see FIG.(8)) are divided by 4. Correspondingly, the GPU may has 96 cores and the segment effort vector SEV2 for the GPU is divided by 96 (or multiplied by ~0.01). Correspondingly, the predetermined segment effort vector SEV0 (for reasons of clarity not shown in FIG. 9) representing the effort to execute the segment in a sequential/scalar manner on the CPU may or may not be updated here.

According to embodiments, further and/or other data are taken into account in order to create and/or update the segment effort information and/or further and/or other factors than the number of elements in the size descriptor of data structure instances may be used. For example, further device specific properties like kernel execution trigger overhead, length of CPU vector extension units, memory bus transfer rates between devices, core grouping information, and/or actual or intended device utilization may be considered.

Also, further size information may be used to relate effort information to the actual data structures instantiated for execution of a segment. For example, constant factors may be included in a size descriptor or added to the computed effort. Or in addition to the size information described above, like number of dimensions, number of elements, length of dimensions, integer or fractional powers of such or further numbers may be used to describe the size of a data structure instance. Any information related to the influence which is done by the data structure instance to the effort of executing the segment may be used inside a segment effort evaluation, including, for example values of elements of the data structure, symmetry information, data range information, boolean or integer flags describing further properties of the data structure.

At compile stage, one kernel template is typically created for each device category. The kernel templates implement the numerical operation intended by the instructions of the segment.

Such templates may be used to efficiently implement and adapt the kernel code at start-up stage when the actual execution units are known. Examples of adaptation include the consideration of device properties like cache sizes, cache line lengths, SIMD vector extension unit lengths, supported feature set, precision supported by the device, frequency, number of cores, etc. Such information may be used to adapt the kernel and/or the kernel templates for faster execution on the processing units.

In order to make the method useful for a wide range of applications of numerical algorithms, the overhead of the method is desired to be kept as small as possible. This down-shifts the break-even point, more particular the size of array data instances above which the advantages of the method by execution on supplementary devices exceeds the overhead added by the method itself.

The methods described herein become already profitable at a reasonable low number. In this way, for example, parallel potential can be utilized even for relatively small array sizes.

As is true for other areas of computing, memory transfers are one of the major bottlenecks in modern (von Neumann) computer architectures. Therefore, data buffer exchange between devices is to be handled carefully, memory management on the devices should be especially efficient and the input data structure may support the invention with certain design advantages described in the following.

In this respect, it is advantageous if arrays (data structure instances) track their current storage locations, e.g. the arrays may store the locations of device buffers, where their elements have been copied to. This way, the information stored in an array may exist on multiple device memories at the same time. All such devices can access the array with little overhead.

The compiler may decide to support memory management on the processing units by optimizing segment implementations for the intent of its arguments. Hereby, 'intent' refers to at least one of the lifetime and the mutability of an argument. Therefore, distinction between the segment arguments intent can be built into the language (distinct InArray, OutArray, LocalArray and ReturnArray types). Utilizing immutability (read-only input arrays) and volatility (self-destructing return array types) saves array copies and realizes an early, deterministic disposal for array storages—even for languages which do not support deterministic object destruction from the start.

Device buffer storage may be allocated for input array arguments on demand and gets the same lifetime as the array's storage itself. Once copied to the device the buffer stays there until the array is disposed or changed. This way a cheap re-utilization of the array (buffer) in a potential subsequent segment invocation is enabled.

Segments output arguments typically invalidate (dispose/release) all other storage locations for the array and a new buffer becomes the only storage location for the array.

Released buffers may also stay on the device for later reusing (pooling).

Arrays data storage is typically maintained separately from the array size descriptors. This allows sharing (large) data storages among subarrays of the same source array, differing only by individual size descriptors (sometimes referred to as 'views').

Arrays may create lazy copies of their storages only ('lazy copy on write').

Furthermore, runtime segments may be executed asynchronously on devices supporting it. Typically, one device at a time (often the host controller) is responsible for determining the best suited processing unit for a runtime segment and/or for queueing the runtime segment to the determined processing unit asynchronously. I.e.: the controlling device does not wait for the execution of the runtime segment's compute kernel to have finished until the method proceeds with the next runtime segment.

FIG. 10 illustrates method steps associated with the asynchronous execution of multiple runtime segments and instructions involving the creation-, accessing and releasing of and the computation with data structures capable of storing multiple elements of a common data type such as array objects.

According to an embodiment, two additional items are stored and maintained in array objects for each supported device, namely a buffer handle and a sync handle.

The buffer handle stores a reference to the buffer of the array data (data structure instance) on the device specific memory, if applicable. The type of the buffer handle may vary with the device type and/or the interface used to access the devices.

The synch handle may be used to synchronize access to the buffer storage for a specific device.

Synch handles may either be obtained from device specific interfaces (e.g. OpenCL, MPI) or created and maintained by the host application codes.

In the exemplary embodiment illustrated in FIG. 10, two processing units exist: a CPU host device implementing memory as managed heap (device 0) and a GPU (device 2) with dedicated GPU memory.

Please note that the actual type of devices (processing units) may not be of importance since all devices may be utilized via a common interface of the devices. OpenCL, for example allows handling CPU memory in the same way as GPU memory. Likewise, individual shared memory devices can access the same hardware memory. Still, the overall functioning is the same, except that some calls in FIG. 10 would not be required and can be left out for performance reasons.

Similarly, the location indices assigned to the devices are a matter of choice. While the CPU was assigned the index 0 to and the GPU was assigned the index 2 in the FIG. 10, the (device) location indices in the set of supported devices can be different without affecting this scheme.

During start-up (start-up phase), the supported devices are identified and a fixed index is typically assigned to each device. This index is used throughout the whole program execution to locate the device in the location array.

Note further that only the location slots for device 0 and device 2 are shown in the figure. Other slots corresponding to other devices on the system are left out for clarity reasons.

FIG. 10 shows, with the focus on memory management and synchronization, a schematic view of the actions used to asynchronously compute the following array instruction for an input array A:

| [1] | { |
| [2] | ILArray<double> A = rand(1000,2000); |
| [3] | ... |
| [4] | B = Abs(Sin(A * A)); |
| [5] | var c = A.GetArrayForRead( ); |
| [6] | ... |
| [7] | } |

The lines [1] and [7] establish a code block which associates a life time scope to the array A. Arrays scope is included into the following consideration since it allows for deterministic destruction, release, and reusing of the array storages. This is expected to outperform non-deterministic memory management via, e.g. garbage collectors (GC) in most situations, since it allows for releasing and reusing memory in a timely, deterministic manner and safes the overhead of garbage collection and associated costs. Also, explicit scoping simplifies the memory management by allowing the host to work in single-threaded mode, saving synchronization overhead otherwise introduced by locking or other synchronization schemes. Some GC implementations may interfere here due to their multithreaded, non-deterministic object destruction and/or finalization. In this description it is assumed that the language used is able to provide scoping and lifetime information of its objects, respectively.

As soon as the array A leaves the scope of the current block, it is considered as ready for disposal.

In line [2], the array A is created as a matrix with exemplary 1000 rows and 2000 columns filled with random numbers on the host controller. The compiler may identify this array instruction as a (single instruction) segment and at runtime it may be decided to compute the random number on the GPU (device 2).

At this point, no memory of the GPU is allocated yet for the elements of the large matrix A. Instead, the GPU device is instructed to allocate memory for the matrix A on its dedicated device memory. This instruction is made asynchronously: the host does not wait for the device to actually create the buffer but receives a synch handle from the device which is used to identify the asynchronous operation later. While the host controller immediately continues with subsequent operations the synch handle will be used in all future attempts to access the buffer on the device. Such access attempts will wait on the synch handle to switch to "ready state" before performing the access of the buffer. The synch handle is stored in the corresponding device slot of the array storage locations.

The synch handle may be a simple shared, atomic (universal or main) counter. Alternatively, it might be a more sophisticated synchronization object provided by the host framework and/or supported by the operating system or other related execution layers of the system.

Further, a pointer to the buffer may be provided and stored into the same device slot of the array A that corresponds to the GPU device. The buffer handle is used to access the actual storage on the device. Its type may depend on the technology used to access/interface with the device (e.g. OpenCL, MPI, OpenMP). The buffer handle may be provided in the same call which provided the synch handle. Or it may be provided in a later call using the synch handle to query the buffer pointer from the device. Or the creation of the buffer may be implemented in a synchronous manner altogether.

As soon as the buffer is established (even if it is not yet known whether the buffer creation is completed yet), the execution of the selected compute kernel is triggered. Such triggering may be performed by queueing a corresponding command on a command queue or similar, as provided by the low-level interface used to access the processing unit.

Both, the synch handle and the buffer handle are typically provided to the kernel. The call, again, is performed asynchronously. It returns without waiting for the completion of any (potentially time consuming) action associated with the call. The compute kernel waits on the synch handle in case that the last operation was not finished and the buffer may not be accessible yet. This waiting and any potentially expensive and/or time consuming computations in the compute kernel are performed without delaying the host processor thread.

The call which triggers the asynchronous execution of the compute kernels provides a second synch handle to the host. The second synch handle is used to identify the kernel operation later on. Note how both asynchronous operations are chained: the kernel execution waits for the buffer creation. Hence the second synch handle returned is suitable to identify a ready state of the device buffer after completion of all previous commands. Therefore, it is sufficient to store the second synch handle by replacing the first one—which is no longer needed at this point in the program.

In other embodiments the synch handles may not be chainable. Each operation may require a new handle to be generated. Synchronization may be performed without support by the low—level device interface. In these embodiments is might be required to implement a queue or a data structure similar to a queue in order to store and manage the synchronization information associated with the above commands. Thereafter, the single storage slot for a synch handle for each device might become a reference to a queue or another collection. However, higher management overhead is expected in this case.

After the computation of rand (1000,2000) (seg_001 in FIG. 10) was triggered, the host stores the synch handle returned by the call in the array storage location slot for device 2 and immediately continues with subsequent operations. The existence of the synch handle in the storage location slot informs other consumers of the array that an operation utilizing the array's storage is still in progress. Operations which may have to consider sync handle existence include accessing the buffer as output buffer (i.e.: modifying the buffer by a kernel) and the release of the buffer.

According to line [4] of the above code list, the next operation involves the same array A. At the time the host instruction counter reaches the corresponding segment (let's assume this is segment seg_042), the state of the completion of seg_001 it not determined.

Therefore, the host synchronizes the new segments execution with the previous execution by providing the buffer handle and the synch handle stored in the array location slot for device 2. The kernel immediately returns a new synch handle and waits for the synch handle provided (if any) before starting execution. It must be noted that synch handles in general are optional. The whole scheme or arbitrary combinations of individual devices may also work synchronously or implement other schemes for synchronization. Note further that the output of seg_0042 is omitted here for clarity.

According to line [5] of the above code list, the next operation requests a local host array representing the array elements as a 1D system array object. Since A's data so far exist only on the GPU device 2 elements of A need to be copied to the host device 0. This copy, again, is performed asynchronously. A new synch handle is returned immediately from the copy command to the device 0—this time corresponding to a new buffer on device 0. Similar to the array buffer creation above, a buffer handle may be returned immediately or requested/stored later on. Alternatively, the copy of the data may be preceeed by an explicit buffer creation command.

Note that the buffer handle is read from the buffer on device 2 only. Since no modifications are performed to the buffer on device 2, no new synch handle for device location 2 is needed in this step.

It is assumed that the following instruction(s) are performed on the host, accessing the system array returned from A.GetArrayForRead( ). Therefore, it is to be guaranteed that all elements have been copied to the device 0 buffer already.

For this purpose, a memory barrier may be introduced which allows to wait for the completion of the copy operation by means of the synch handle in the device storage location 0. Such memory barrier works in the same way known from common synchronization methods and can be used to wait synchronously for the completion of operations on any device. Similar wait mechanisms may be used, for example, when attempting to release a buffer.

Finally, array A leaves the scope of the current code block. Since A is not referenced anymore afterwards, the storages associated with A may be disposed as soon as possible to free the memory areas consumed on the (limited) device memory. Such disposals take the existence of any synch handles into account. The method may uses implicit memory barriers (as with the WaitSynchHandle( ) method in FIG. 10) before releasing the memory. Or asynchronous release operations may be used if the device interface supports such.

Note that the method may or may not implement a 1:1 relation between array objects and device buffers. For most efficient memory management, it might be desired to allow multiple arrays to utilize/reference the same buffer storage, e.g. in a "lazy copy on-write" scheme. Accordingly, the disposal of an array may not immediately lead to the release of its buffers. Instead reference counting could be used to decrement a reference counter of the shared storage object. The buffers are released as soon as the reference counter indicates that no further arrays exist referencing this storage.

Asynchronous execution can help to keep the devices of a heterogeneous computing system busy and to utilize the existing computing resources more efficiently and therefore to finish the execution of the sequence earlier or to consume less energy.

When queueing a runtime segment for execution on a device, a measure for the cost of the segment is computed (anyways). This measure can also be used as a representation of the number of instructions 'waiting' in the queue. The accumulated measure of all segments currently 'waiting' in the queue for execution gives an indication about the operations 'ahead' in the device queue.

Accordingly, also the fact that each item may correspond to an individual number of (numeric) operations in the item can be taken into account.

The decision for the 'optimal' device may also be based on this cost 'ahead'. When a device has many segments in the queue it can be better to invest the cost of a data buffer copy to another device and perform/queue the segment on the other device instead.

Furthermore, a low-level interface (e.g. OpenCL) may be configured to execute the runtime segments in any order. If the low level device interface or the higher level management layer decides that a different order than the order the segments were originally lined up in the sequence is advantageous in terms of performance or other aspects and that exchanging the order does not introduce negative side effects to the sequence results, it may rearrange the order of execution.

Rearranging the order of execution may even allow executing some runtime segments on multiple devices concurrently. For example, rearranging a sequence of segments may group together such segments which depend on each other's result(s). Also, it can group together such segments, which require the same or mostly the same arguments/data buffers. The grouping can also happen based on the current locality of the data buffers. All this can increase the chance for such groups of segments to be concurrently executable in an efficient manner on multiple devices. For example, a first group of rearranged runtime segments may be asynchronously executed on the first device while subsequent runtime segments forming a second group may be queued to the second device for asynchronous execution. Since data dependencies between the groups are kept low, both runtime segment groups can be executed with low synchronization effort.

Accordingly, the method is able to keep many or even all of the devices busy to an advantageous degree. Thus, computing resources are better utilized.

According to an embodiment, a computer-implemented method includes identifying a program segment in a program code, typically a sequence of program segments. The program segment includes a computing instruction, typically a numerical operation, for a first data structure capable of storing multiple elements of a first common data type and a function meta information comprising data related to an output of the computing instruction. A first processing unit and a second processing unit of a computing system which are suitable for executing a respective compiled representation (typically a compute kernel) of the program segment are determined. The first processing unit is different from the second processing unit. The first processing unit is initialized with a first compiled representation of the program segment and the second processing unit is initialized with a second compiled representation of the program segment. The function meta information and a data meta information of a runtime instance of the first data structure are used to determine first expected costs of executing the first compiled representation on the first processing unit and to determine second expected costs of executing the second compiled representation on the second processing unit. The first expected costs and the second expected costs are used to select either the first processing unit or the second processing unit for executing the respective compiled representation, typically the processing unit with lower expected costs. The first and second costs are typically numerically determined (numerically calculated).

Alternatively, the first expected costs and the second expected costs may be used to select either only one of the first processing unit and the second processing unit for executing the respective compiled representation or to determine respective shares of a workload of executing the respective compiled representation on the first processing unit and on the second processing unit.

Sharing the workload may be invoked if the computing instruction is suitable for executing on portions of the runtime instance. This is in particular the case for computing instructions that can be performed element by element or on separable regions of the data. Examples include numerical operations such as adding matrices, calculating a function of a matrix A such as sin(A) and smoothing data.

Sharing the workload is typically achieved by assigning a first portion of the runtime instance to the first processing unit and assigning a second portion of the runtime instance to the second processing unit. The workload may be shared according to the expected costs, for example inversely related to the expected costs, and/or expected execution time. The expected execution time may be derived from the expected costs and the actual availability or workload of the processing units.

Typically, the workload is shared if a runtime size of the runtime instance is sufficiently large and/or if it is found or anticipated that the utilization of at least one processing unit available on the system is low compared to other processing units. In the latter case the runtime segment, the compiler at runtime or a scheduling module may decide to share the underutilized processing unit(s) with one or more devices with higher utilization in order to distribute at least some of the workload from the busy device(s) to the underutilized device(s).

Shared devices may form so called 'virtual devices' and are especially useful if asynchronous execution and out of order execution is not available for the processing units. This may be the case if the underlying low-level interface handling the access of the processing units does not support such features and/or if the instructions show too many dependencies so that a reordering of instructions/segments and/or a distribution of segments over multiple devices is not possible or not feasible.

Furthermore, when instances of data structures span the memory of multiple devices (distributed memory) virtual devices enable the devices involved in the execution of segments with such distributed instances to be used according to this invention. The virtual device is thereby considered a processing unit and handled as described above.

Another scenario where virtual devices are advantageous for the performance of execution sequences are shared memory devices, for example CPUs sharing memory with GPU devices. Here, a virtual device comprising all or parts of the CPU cores and all or parts of the GPU cores may expose higher computational capabilities than the underlying separate devices. Since no transfer costs are involved (due to the shared memory) substituting either one of the underlying devices with the virtual device will lead to higher execution performance.

According to an embodiment, a computer-readable medium stores instructions which, when executed by a computer, cause the computer to carry out any of the above explained methods and/or at least one of the following processes that may at least partially be implemented as an API (Application Programming Interface): retrieving software code, typically a user code written in a GPL or in a scientific computing language such as MATLAB or NumPy, identifying in the software code a program segment comprising a numerical operation for a first data structure capable of storing multiple elements of a common data type, determining a function meta information referring to an output of the numerical operation, in particular a size of the output, a structure of the output, and/or an effort for generating the output, determining the processing units of the computer or another heterogeneous computing system as suitable for performing the numerical operation, and translating the program segment into an intermediate representation, in particular a byte code representation, or into a representation which is executable on the computer or the other heterogeneous computing system, in particular a runtime segment of the program segment.

Typically, the runtime segment includes the function meta information, a compute kernel for each of the determined processing units and executable code for determining expected costs for executing the compute kernels with a runtime instance of the first data structure using the function meta information and a data meta information of the runtime instance of the first data structure. The data meta information may include a runtime size information of the runtime instance, a runtime location information of the runtime instance, and a runtime type information of the runtime instance.

Determining the function meta information may include reading the function meta information if they are already stored in the software code, searching in a look-up table storing function meta information for (already) known numerical operations such as adding, sinus, FFT (fast Fourier transform) etc. and/or even deriving the function meta information based on test runs.

According to an embodiment of a computer-implemented method, the method includes initializing a first processing unit of a heterogeneous computing system with a first compute kernel and a second processing unit of the heterogeneous computing system with a second compute kernel. Both the first compute kernel and the second compute kernel are configured to perform a numerical operation derived from a program segment which is configured to receive a first data structure storing multiple elements of a common data type. The program segment includes a function meta information including data related to a size of an output of the numerical operation, a structure of the output, and/or an effort for generating the output. The function meta information and a data meta information of a runtime instance of the first data structure are used to determine first expected costs of executing the first kernel on the first processing unit to perform the numerical operation with the runtime instance and to determine second expected costs of executing the second kernel on the second processing unit to perform the numerical operation with the runtime instance. The data meta information includes at least one of a runtime size information of the runtime instance, a runtime location information of the runtime instance, a runtime synchronization information of the runtime instance and a runtime type information of the runtime instance. The method further includes one of executing the first compute kernel on the first processing unit to perform the numerical operation on the runtime instance if the first expected costs are lower than or equal to the second expected costs, and executing the second compute kernel with the second processing unit to perform the numerical operation with the runtime instance if the first expected costs are higher than the second expected costs.

According to an embodiment of a computer-implemented method, the method comprises initializing a heterogeneous computing system comprising a first processing unit and a second processing unit with a runtime segment for performing a numerical operation with a first data structure storing multiple elements of a common data type. The runtime segment comprises a first compute kernel configured to perform the numerical operation on the first processing unit, a second compute kernel configured to perform the numerical operation on the second processing unit, and a function meta information comprising a first numerical effort for performing the numerical operation with one element of the common data type on the first processing unit and a second numerical effort for performing the numerical operation with one element of the common data type on the second processing unit. A runtime instance of the first data structure is created in the heterogeneous computing system. A data meta information of the runtime instance is determined. The data meta information comprises a runtime size information of the runtime instance and a runtime location information of the runtime instance. The data meta information and the function meta information are used to (numerically) calculate first expected costs of executing the first compute kernel on the first processing unit to perform the numerical operation with the runtime instance and to (numerically) calculate second expected costs of executing the second compute kernel on the second processing unit to perform the numerical operation with the runtime instance. The first compute kernel is executed on the first processing unit to perform the numerical operation with the runtime instance if the first expected costs are lower than or equal to the second expected costs. Otherwise, the second compute kernel is executed on the second processing unit to perform the numerical operation with the runtime instance.

The function meta information may further comprise data related to a size of an output of the numerical operation, and/or data related to a structure of the output.

Prior to calculating the first and second expected costs, the function meta information, in particular the first and second numerical efforts are typically updated in accordance with determined properties of the first processing unit and determined properties of the second processing unit.

Furthermore, the first compute kernel and/or the second compute kernel may be updated in accordance with determined properties of the first processing unit and determined properties of the second processing unit, respectively, prior to calculating the first and second expected costs.

The runtime segment typically includes control code for calculating the first and second costs and/or dynamically deciding based on the first and second costs on which of the processing units the respective compute kernel is to be executed.

The runtime segment may be derived from a program segment defining the numerical operation.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Such modifications to the inventive concept are intended to be covered by the appended claims.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A method of operating a heterogeneous computing system comprising:
    initializing a first processing unit of the heterogeneous computing system with a first compute kernel and a second processing unit of the heterogeneous computing system with a second compute kernel, wherein each of the first compute kernel and the second compute kernel is configured to perform a numerical operation derived from a program segment configured to receive a first data structure storing multiple elements of a common data type, the program segment comprising a function meta information comprising data related to a size of an output of the numerical operation, a structure of the output, and/or an effort for generating the output;
    using the function meta information and a data meta information of a runtime instance of the first data structure to numerically calculate first expected costs of executing the first compute kernel on the first processing unit to perform the numerical operation with the runtime instance and to numerically calculate second expected costs of executing the second compute kernel on the second processing unit to perform the numerical operation with the runtime instance, wherein the data meta information comprises a runtime size information of the runtime instance and a runtime location information of the runtime instance; and
    one of:
        executing the first compute kernel on the first processing unit to perform the numerical operation on the runtime instance if the first expected costs are lower than or equal to the second expected costs; and executing the second compute kernel on the second processing unit to perform the numerical operation on the runtime instance if the first expected costs are higher than the second expected costs.

2. The method of claim 1, wherein the program segment is further configured to receive a second data structure capable of storing multiple elements of the common data type or another common data type, wherein a data meta information of a runtime instance of the second data structure is used to numerically calculate the first expected costs and the second expected costs, and wherein the data meta information of the runtime instance of the second data structure information comprises a runtime size information of the runtime instance of the second data structure and a runtime location information of the runtime instance of the second data structure.

3. The method of claim 1, wherein the respective data meta information further comprises a runtime synchronization information of the respective runtime instance, and/or a runtime type information of the respective runtime instance.

4. The method of claim 1, wherein at least one of the first data structure, the runtime instance of the first data structure, the runtime instance of the second data structure and the second data structure is capable to store a variable number of elements of the respective common data type, wherein at least one of the first data structure, the runtime instance of the first data structure, the runtime instance of the second data structure and the second data structure is capable to store and/or comprises at least one of a collection, a vector, an array, a list, a queue, a stack, a graph, a tree and a n-dimensional rectilinear data structure, wherein at least one of the runtime instance of the first data structure and the runtime instance of the second data structure comprises an image, wherein at least one of the runtime instance of the first data structure and the runtime instance of the second data structure comprises measured data, and/or wherein the numerical operation is an array operation.

5. The method of claim 1, wherein at least one of the first data structure, the runtime instance of the first data structure, the runtime instance of the second data structure, and the second data structure is capable to store a respective runtime meta information, and/or wherein the runtime meta information comprises a runtime size information, a runtime location information, a runtime synchronization information, and/or a runtime type information.

6. The method of claim 1, wherein a polynomial cost function is used for calculating the first and second expected costs, wherein calculating the first and second expected costs comprises at least one of determining computational costs and determining transfer costs; and/or wherein the first and second expected costs are calculated during runtime and/or after initializing the first processing unit and the second processing unit.

7. The method of claim 1, wherein the effort for generating the output is used for calculating the first expected costs and the second expected costs.

8. The method of claim 1, wherein the effort for generating the output comprises a first numerical effort for performing the numerical operation with one element of the common data type on the first processing unit and a second numerical effort for performing the numerical operation with one element of the common data type on the second processing unit.

9. The method of claim 8, wherein the first numerical effort is updated in accordance with determined properties of the first processing unit and/or wherein the second numerical effort is updated in accordance with determined properties of the second processing unit.

10. The method of claim 1, prior to initializing the first processing unit and the second processing unit further comprising executing a control kernel on the heterogeneous computing system, wherein the control kernel is configured to determine properties of the first processing unit and the second processing unit, to update the function meta information in accordance with determined properties of the first processing unit and the second processing unit, to calculate the first expected costs and the second expected costs, to select based on the first expected costs and the second expected costs the first processing unit or the second processing unit for executing the respective compute kernel and/or to initiate executing the respective compute kernel on the selected processing unit.

11. The method of claim 1, further comprising at least one of:
determining properties of the first processing unit and/or the second processing unit;
updating the respective function meta information in accordance with the determined properties of the first processing unit and/or determined properties of the second processing unit;
determining the first processing unit and the second processing unit as suitable for performing the numerical operation;
determining, at runtime and prior to calculating the first and second expected costs, at least one of a dimension of the first data structure and a number of stored elements in the first data structure; and
determining, at runtime and prior to calculating the first and second expected costs, at least one of a dimension of the runtime instance of the second data structure and a number of stored elements in the runtime instance of the second data structure.

12. The method of claim 1, further comprising:
initializing the first processing unit with a further first compute kernel and the second processing unit with a further second compute kernel, wherein each of the further first compute kernel and the further second compute kernel is configured to perform a further numerical operation derived from a subsequent program segment configured to receive the first data structure and/or a further data structure storing multiple elements of the common data type or another common data type and representing the output of the numerical operation, wherein the subsequent program segment comprises a further function meta information comprising data related to a size of an output of the further numerical operation, a structure of the output of the further numerical operation, and/or an effort for generating the output of the further numerical operation; and/or
using the further function meta information and at least one of a data meta information of a further runtime instance of the further data structure and the data meta information of the runtime instance of the first data structure to numerically calculate further first expected costs of executing the further first compute kernel on the first processing unit to perform the further numerical operation with the runtime instance and/or the further runtime instance, and to numerically calculate second expected costs of executing the second compute kernel on the second processing unit to perform the further numerical operation with the runtime instance and/or the further runtime instance, wherein the data meta information of the further runtime instance comprises a runtime size information of the further runtime instance and/or a runtime location information of the further runtime instance.

13. The method of claim 1, wherein the numerical operation is an instruction of a reduced set of computing instructions for the first data structure and/or the second data structure, and/or wherein the further numerical operation is an instruction of the reduced set of computing instructions for the first data structure and/or the further data structure.

14. The method of claim 1, further comprising at least one of:
identifying the program segment in a program code;
identifying the subsequent program segment in the program code;
creating from the program segment a runtime segment comprising the first compute kernel, the second compute kernel, and the function meta information;
creating from the subsequent program segment a subsequent runtime segment comprising the further first compute kernel, the further second compute kernel, and the further function meta information;
translating the respective program segment into an intermediate representation, in particular a byte code representation or into a respective representation facilitating the execution on the first processing unit and the second processing unit;
updating the respective runtime segment in accordance with the determined properties of the first processing unit and/or properties of the second processing unit; and
compiling at least one of the intermediate representation, the byte code representation and the respective representation facilitating the execution on the first processing unit and the second processing unit into the respective compute kernels.

15. The method of claim 1, wherein the program segment is translated into at least one of a representation facilitating the execution on a host processor of the heterogeneous computing system, a representation facilitating the execution on single core CPU of the heterogeneous computing system, a representation facilitating the execution on a multicore CPU of the heterogeneous computing system, a representation facilitating the execution on a CPU vector extension of the heterogeneous computing system, a representation facilitating the execution on a GPU of the heterogeneous computing system, a representation facilitating the execution on a SIMD accelerator of the heterogeneous computing system, a representation facilitating the execution on a DSP of the heterogeneous computing system, a representation facilitating the execution on a microprocessor of the heterogeneous computing system, a representation facilitating the execution on a microcontroller of the heterogeneous computing system, a representation facilitating the execution on an virtual device of the heterogeneous computing system, and a representation facilitating the execution on an FPGA of the heterogeneous computing system.

16. The method of claim 1, further comprising at least one of:
identifying in the program code a sequence comprising several program segments each being configured to receive the first data structure and/or a second data structure storing multiple elements of the common data type or another common data type, and comprising a function meta information comprising data related to a size of an output of the numerical operation, a structure of the output, and/or an effort for generating the output;
creating from each of the program segments a respective runtime segment so that each of the runtime segments comprise a respective first compute kernel, a respective second compute kernel, and respective function meta information referring to a respective numerical operation for the runtime instance of the first data structure and/or a runtime instance of the second data structure;
calculating respective first and second expected costs for executing the first and second compute kernels of each runtime segment; and
using the respective first expected costs and the respective second expected costs to decide on which of the first processing unit and the second processing unit the respective compute kernel is executed.

17. A computer-readable non-transitory storage medium comprising instructions which, when executed by a heterogeneous computing system comprising a first processing unit and a second processing unit cause the computing system to carry out a method comprising:
initializing a first processing unit of a heterogeneous computing system with a first compute kernel and a second processing unit of the heterogeneous computing system with a second compute kernel, wherein each of the first compute kernel and the second compute kernel is configured to perform a numerical operation derived from a program segment configured to receive a first data structure storing multiple elements of a common data type, the program segment comprising a function meta information comprising data related to a size of an output of the numerical operation, a structure of the output, and/or an effort for generating the output;
using the function meta information and a data meta information of a runtime instance of the first data structure to numerically calculate first expected costs of executing the first compute kernel on the first processing unit to perform the numerical operation with the runtime instance and to numerically calculate second expected costs of executing the second compute kernel on the second processing unit to perform the numerical operation with the runtime instance, wherein the data meta information comprises a runtime size information of the runtime instance and a runtime location information of the runtime instance; and
one of:
executing the first compute kernel on the first processing unit to perform the numerical operation on the runtime instance if the first expected costs are lower than or equal to the second expected costs; and
executing the second compute kernel on the second processing unit to perform the numerical operation on the runtime instance if the first expected costs are higher than the second expected costs.

18. A heterogeneous computing system comprising:
a memory storing a runtime segment of a program segment configured to receive a first data structure capable to store multiple elements of a common data type, the program segment comprising a function meta information comprising data related to a size of an output of a numerical operation of the program segment, a structure of the output, and/or a numerical effort for generating the output; and
at least two different processing units,
wherein each of the at least two different processing units has access to and/or forms a part of the memory storing a respective compute kernel of the runtime segment, each compute kernel implementing the numerical operation, wherein the runtime segment comprises executable code for determining a data meta information of a runtime instance of the first data structure, the data meta information comprising a runtime size information of the runtime instance and a runtime location information of the runtime instance, wherein the runtime segment comprises executable code using the function meta information and the data meta information to calculate for each of the at least two different processing units respective expected costs of executing the respective compute kernels to perform the numerical operation with the runtime instance, and wherein the runtime segment comprises executable code for selecting one of the at least two different processing units for executing the respective compute kernel, the calculated expected costs of the selected one of the at least two processing units corresponding to a lowest value of the determined expected costs.

19. The heterogeneous computing system of claim 18, wherein the heterogeneous computing system comprises a base processor coupled with the at least two different processing units, wherein the base processor is configured to load the respective compute kernels to at least one of the at least two different processing units, wherein the heterogeneous computing system is a heterogeneous computer, wherein the base processor is a host processor of a host controller of the heterogeneous computer, wherein the base processor forms one of the at least two different processing units, wherein at least one of the at least two different processing units are selected from the group consisting of a single core CPU, a multicore CPU, a CPU vector extension, a GPU, a SIMD accelerator, a DSP, a microprocessor, a microcontroller, and an FPGA, and/or wherein at least one of the at least two different processing units comprises at least one single core CPU, at least one multicore CPU, at least one CPU vector extension, at least one GPU, at least one SIMD accelerator, at least one DSP, at least one microprocessor, at least one microcontroller, and/or at least one FPGA.

20. The heterogeneous computing system of claim 18, wherein the data meta information comprises at least one of a runtime synchronization information of the runtime instance, and a runtime type information of the runtime instance, and/or wherein the heterogeneous computing system is configured to perform a method comprising:

initializing a first processing unit of a heterogeneous computing system with a first compute kernel and a second processing unit of the heterogeneous computing system with a second compute kernel, wherein each of the first compute kernel and the second compute kernel is configured to perform a numerical operation derived from a program segment configured to receive a first data structure storing multiple elements of a common data type, the program segment comprising a function meta information comprising data related to a size of an output of the numerical operation, a structure of the output, and/or an effort for generating the output;

using the function meta information and a data meta information of a runtime instance of the first data structure to numerically calculate first expected costs of executing the first compute kernel on the first processing unit to perform the numerical operation with the runtime instance and to numerically calculate second expected costs of executing the second compute kernel on the second processing unit to perform the numerical operation with the runtime instance, wherein the data meta information comprises a runtime size information of the runtime instance and a runtime location information of the runtime instance; and one of:
executing the first compute kernel on the first processing unit to perform the numerical operation on the runtime instance if the first expected costs are lower than or equal to the second expected costs; and
executing the second compute kernel on the second processing unit to perform the numerical operation on the runtime instance if the first expected costs are higher than the second expected costs.

* * * * *